(12) United States Patent
Purkayastha et al.

(10) Patent No.: US 12,464,413 B2
(45) Date of Patent: Nov. 4, 2025

(54) CONDITIONAL HANDOVER WITH MULTIPLE RADIO ACCESS TECHNOLOGY DUAL CONNECTIVITY

(71) Applicant: QUALCOMM Incorporated, San Diego, CA (US)

(72) Inventors: Punyaslok Purkayastha, San Diego, CA (US); Ozcan Ozturk, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 18/048,259

(22) Filed: Oct. 20, 2022

(65) Prior Publication Data

US 2023/0128210 A1     Apr. 27, 2023

Related U.S. Application Data

(60) Provisional application No. 63/262,851, filed on Oct. 21, 2021.

(51) Int. Cl.
*H04W 36/00*      (2009.01)
*H04W 36/36*      (2009.01)

(52) U.S. Cl.
CPC . *H04W 36/0016* (2013.01); *H04W 36/00698* (2023.05); *H04W 36/362* (2023.05)

(58) Field of Classification Search
None
See application file for complete search history.

(56) References Cited

U.S. PATENT DOCUMENTS

2022/0394584 A1* 12/2022 Ishii .................... H04W 36/305
2023/0007553 A1* 1/2023 Rugeland ........ H04W 36/00837
(Continued)

FOREIGN PATENT DOCUMENTS

WO     2021080481 A1     4/2021

OTHER PUBLICATIONS

Ericsson: "CHO in MR-DC Operation", 3GPP TSG-RAN WG3 Meeting #108-e, R3-203793, 3rd Generation Partnership Project, Mobile Competence Centre, 650, Route Des Lucioles, F-06921 Sophia-Antipolis Cedex, France, vol. RAN WG3, No. Online, Jun. 1, 2020-Jun. 12, 2020, 6 Pages, May 21, 2020, XP051887860, the whole document.

(Continued)

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, a network node may receive, from a source master node, a secondary node release request corresponding to a conditional handover operation associated with a user equipment (UE) operating in accordance with multiple radio access technology dual connectivity, wherein the secondary node release request indicates that the network node is to continue to be a secondary node associated with the UE or that a target secondary node is to be the secondary node associated with the UE. The network node may perform a data transfer operation based at least in part on receiving the secondary node release request. Numerous other aspects are described.

23 Claims, 16 Drawing Sheets

(56) References Cited

U.S. PATENT DOCUMENTS

| | | | |
|---|---|---|---|
| 2023/0180065 A1* | 6/2023 | Da Silva | H04W 36/38 370/331 |
| 2023/0199577 A1* | 6/2023 | Da Silva | H04W 76/30 370/331 |
| 2023/0217280 A1* | 7/2023 | Wallentin | H04W 52/0229 370/252 |
| 2024/0098588 A1* | 3/2024 | Da Silva | H04W 36/24 |

OTHER PUBLICATIONS

Huawei (Moderator): "Summary of Offline Discussion on MRDC3_CPAC", 3GPP TSG-RAN WG3 Meeting #113-e, R3-214304, 3rd Generation Partnership Project, Mobile Competence Centre, 650, Route Des Lucioles, F-06921 Sophia-Antipolis Cedex, France, vol. RAN WG3, No. E-meeting, Aug. 16, 2021-Aug. 26, 2021, 36 Pages, Aug. 25, 2021, XP052043465, paragraph [5.6.1]-paragraph [5.6.2].

International Search Report and Written Opinion—PCT/US2022/078521—ISA/EPO—Apr. 6, 2023.

Partial International Search Report—PCT/US2022/078521—ISA/EPO—Feb. 15, 2023.

Qualcomm Incorporated: "CHO with SCG Configuration", 3GPP TSG-RAN WG3 Meeting #115-e, R3-221751, 3rd Generation Partnership Project, Mobile Competence Centre, 650, Route Des Lucioles, F-06921 Sophia-Antipolis Cedex, France, vol. RAN WG3, No. E-meeting, Feb. 21, 2022-Mar. 3, 2022, 7 Pages, Feb. 11, 2022, XP052107646, the whole document.

* cited by examiner

CONDITIONAL HANDOVER WITH MULTIPLE RADIO ACCESS TECHNOLOGY DUAL CONNECTIVITY

CROSS-REFERENCE TO RELATED APPLICATION

This Patent Application claims priority to U.S. Provisional Patent Application No. 63/262,851, filed on Oct. 21, 2021, entitled "CONDITIONAL HANDOVER WITH MULTIPLE RADIO ACCESS TECHNOLOGY DUAL CONNECTIVITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for conditional handover with multiple radio access technology dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving, from a source master node, a secondary node release request corresponding to a conditional handover operation associated with a user equipment (UE) operating in accordance with multiple radio access technology dual connectivity, wherein the secondary node release request indicates that the network node is to continue to be a secondary node associated with the UE or that a target secondary node is to be the secondary node associated with the UE. The method may include performing a data transfer operation based at least in part on receiving the secondary node release request.

Some aspects described herein relate to a method of wireless communication performed by a UE. The method may include performing conditional handover monitoring measurements according to a conditional handover configuration. The method may include receiving, from a source master node, a radio resource control reconfiguration communication comprising a multiple radio access technology dual connectivity configuration. The method may include stopping performing the conditional handover monitoring measurements based at least in part on the multiple radio access technology dual connectivity configuration.

Some aspects described herein relate to a method of wireless communication performed by a network node. The method may include transmitting, to a UE, a radio resource control reconfiguration communication comprising a multiple radio access technology dual connectivity configuration. The method may include receiving a reconfiguration completion message that indicates a successful application of the multiple radio access technology dual connectivity configuration. The method may include transmitting a conditional handover configuration message to the UE that indicates a conditional handover configuration to be used by the UE.

Some aspects described herein relate to a method of wireless communication performed by a UE. The method may include receiving, from a source master node, a first radio resource control reconfiguration communication comprising a conditional handover configuration. The method may include receiving, from a source master node, a second radio resource control reconfiguration communication comprising a conditional primary secondary cell group cell (PSCell) configuration, wherein the conditional PSCell configuration comprises a conditional PSCell addition configuration or a conditional PSCell change configuration. The method may include performing conditional handover monitoring measurements according to the conditional handover configuration and performing conditional PSCell monitoring measurements according to the conditional PSCell configuration. The method may include stopping performing the conditional handover monitoring measurements based at least in part on an occurrence of a trigger event corresponding to the conditional PSCell configuration.

Some aspects described herein relate to a method of wireless communication performed by a network node. The method may include transmitting, to a UE, a first radio resource control reconfiguration communication comprising a conditional handover configuration. The method may include transmitting, to the UE, a second radio resource control reconfiguration communication comprising a conditional PSCell configuration, wherein the conditional PSCell configuration comprises a conditional PSCell addition configuration or a conditional PSCell change configuration.

Some aspects described herein relate to a network node for wireless communication. The network node may include a memory and one or more processors coupled to the memory. The one or more processors may be configured to receive, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE. The one or more processors may be configured to perform a data transfer operation based at least in part on receiving the secondary node release request.

Some aspects described herein relate to a UE for wireless communication. The user equipment may include a memory and one or more processors coupled to the memory. The one or more processors may be configured to perform conditional handover monitoring measurements according to a conditional handover configuration. The one or more processors may be configured to receive, from a source master node, a radio resource control reconfiguration communication comprising a multiple radio access technology dual connectivity configuration. The one or more processors may be configured to stop performing the conditional handover monitoring measurements based at least in part on the multiple radio access technology dual connectivity configuration.

Some aspects described herein relate to a network node for wireless communication. The network node may include a memory and one or more processors coupled to the memory. The one or more processors may be configured to transmit, to a UE, a radio resource control reconfiguration communication comprising a multiple radio access technology dual connectivity configuration. The one or more processors may be configured to receive a reconfiguration completion message that indicates a successful application of the multiple radio access technology dual connectivity configuration. The one or more processors may be configured to transmit a conditional handover configuration message to the UE that indicates a conditional handover configuration to be used by the UE.

Some aspects described herein relate to a UE for wireless communication. The user equipment may include a memory and one or more processors coupled to the memory. The one or more processors may be configured to receive, from a source master node, a first radio resource control reconfiguration communication comprising a conditional handover configuration. The one or more processors may be configured to receive, from a source master node, a second radio resource control reconfiguration communication comprising a conditional PSCell configuration, wherein the conditional PSCell configuration comprises a conditional PSCell addition configuration or a conditional PSCell change configuration. The one or more processors may be configured to perform conditional handover monitoring measurements according to the conditional handover configuration and performing conditional PSCell monitoring measurements according to the conditional PSCell configuration. The one or more processors may be configured to stop performing the conditional handover monitoring measurements based at least in part on an occurrence of a trigger event corresponding to the conditional PSCell configuration.

Some aspects described herein relate to a network node for wireless communication. The network node may include a memory and one or more processors coupled to the memory. The one or more processors may be configured to transmit, to a UE, a first radio resource control reconfiguration communication comprising a conditional handover configuration. The one or more processors may be configured to transmit, to the UE, a second radio resource control reconfiguration communication comprising a conditional PSCell configuration, wherein the conditional PSCell configuration comprises a conditional PSCell addition configuration or a conditional PSCell change configuration.

Some aspects described herein relate to a non-transitory computer-readable medium that stores a set of instructions for wireless communication by a network node. The set of instructions, when executed by one or more processors of the network node, may cause the network node to receive, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE. The set of instructions, when executed by one or more processors of the network node, may cause the network node to perform a data transfer operation based at least in part on receiving the secondary node release request.

Some aspects described herein relate to a non-transitory computer-readable medium that stores a set of instructions for wireless communication by a UE. The set of instructions, when executed by one or more processors of the UE, may cause the UE to perform conditional handover monitoring measurements according to a conditional handover configuration. The set of instructions, when executed by one or more processors of the UE, may cause the UE to receive, from a source master node, a radio resource control reconfiguration communication comprising a multiple radio access technology dual connectivity configuration. The set of instructions, when executed by one or more processors of the UE, may cause the UE to stop performing the conditional handover monitoring measurements based at least in part on the multiple radio access technology dual connectivity configuration.

Some aspects described herein relate to a non-transitory computer-readable medium that stores a set of instructions for wireless communication by a network node. The set of instructions, when executed by one or more processors of the network node, may cause the network node to transmit, to a UE, a radio resource control reconfiguration communication comprising a multiple radio access technology dual connectivity configuration. The set of instructions, when executed by one or more processors of the network node, may cause the network node to receive a reconfiguration completion message that indicates a successful application of the multiple radio access technology dual connectivity configuration. The set of instructions, when executed by one or more processors of the network node, may cause the network node to transmit a conditional handover configuration message to the UE that indicates a conditional handover configuration to be used by the UE.

Some aspects described herein relate to a non-transitory computer-readable medium that stores a set of instructions for wireless communication by a UE. The set of instructions, when executed by one or more processors of the UE, may cause the UE to receive, from a source master node, a first radio resource control reconfiguration communication comprising a conditional handover configuration. The set of instructions, when executed by one or more processors of the UE, may cause the UE to receive, from a source master node, a second radio resource control reconfiguration communication comprising a conditional PSCell configuration, wherein the conditional PSCell configuration comprises a conditional PSCell addition configuration or a conditional PSCell change configuration. The set of instructions, when executed by one or more processors of the UE, may cause the UE to perform conditional handover monitoring measurements according to the conditional handover configuration and performing conditional PSCell monitoring measurements according to the conditional PSCell configuration. The set of instructions, when executed by one or more processors of the UE, may cause the UE to stop performing the conditional handover monitoring measurements based at least in part on an occurrence of a trigger event corresponding to the conditional PSCell configuration.

Some aspects described herein relate to a non-transitory computer-readable medium that stores a set of instructions for wireless communication by a network node. The set of instructions, when executed by one or more processors of the network node, may cause the network node to transmit, to a UE, a first radio resource control reconfiguration communication comprising a conditional handover configuration. The set of instructions, when executed by one or more processors of the network node, may cause the network node to transmit, to the UE, a second radio resource control reconfiguration communication comprising a conditional primary PSCell configuration, wherein the conditional PSCell configuration comprises a conditional PSCell addition configuration or a conditional PSCell change configuration.

Some aspects described herein relate to an apparatus for wireless communication. The apparatus may include means for receiving, from a source master node, a secondary node release request corresponding to a conditional handover operation associated with a UE operating in accordance with multiple radio access technology dual connectivity, wherein the secondary node release request indicates that the apparatus is to continue to be a secondary node associated with the UE or that a target secondary node is to be the secondary node associated with the UE. The apparatus may include means for performing a data transfer operation based at least in part on receiving the secondary node release request.

Some aspects described herein relate to an apparatus for wireless communication. The apparatus may include means for performing conditional handover monitoring measurements according to a conditional handover configuration. The apparatus may include means for receiving, from a source master node, a radio resource control reconfiguration communication comprising a multiple radio access technology dual connectivity configuration. The apparatus may include means for stopping performing the conditional handover monitoring measurements based at least in part on the multiple radio access technology dual connectivity configuration.

Some aspects described herein relate to an apparatus for wireless communication. The apparatus may include means for transmitting, to a UE, a radio resource control reconfiguration communication comprising a multiple radio access technology dual connectivity configuration. The apparatus may include means for receiving a reconfiguration completion message that indicates a successful application of the multiple radio access technology dual connectivity configuration. The apparatus may include means for transmitting a conditional handover configuration message to the UE that indicates a conditional handover configuration to be used by the UE.

Some aspects described herein relate to an apparatus for wireless communication. The apparatus may include means for receiving, from a source master node, a first radio resource control reconfiguration communication comprising a conditional handover configuration. The apparatus may include means for receiving, from a source master node, a second radio resource control reconfiguration communication comprising a conditional PSCell configuration, wherein the conditional PSCell configuration comprises a conditional PSCell addition configuration or a conditional PSCell change configuration. The apparatus may include means for performing conditional handover monitoring measurements according to the conditional handover configuration and performing conditional PSCell monitoring measurements according to the conditional PSCell configuration. The apparatus may include means for stopping performing the conditional handover monitoring measurements based at least in part on an occurrence of a trigger event corresponding to the conditional PSCell configuration.

Some aspects described herein relate to an apparatus for wireless communication. The apparatus may include means for transmitting, to a UE, a first radio resource control reconfiguration communication comprising a conditional handover configuration. The apparatus may include means for transmitting, to the UE, a second radio resource control reconfiguration communication comprising a conditional PSCell configuration, wherein the conditional PSCell configuration comprises a conditional PSCell addition configuration or a conditional PSCell change configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
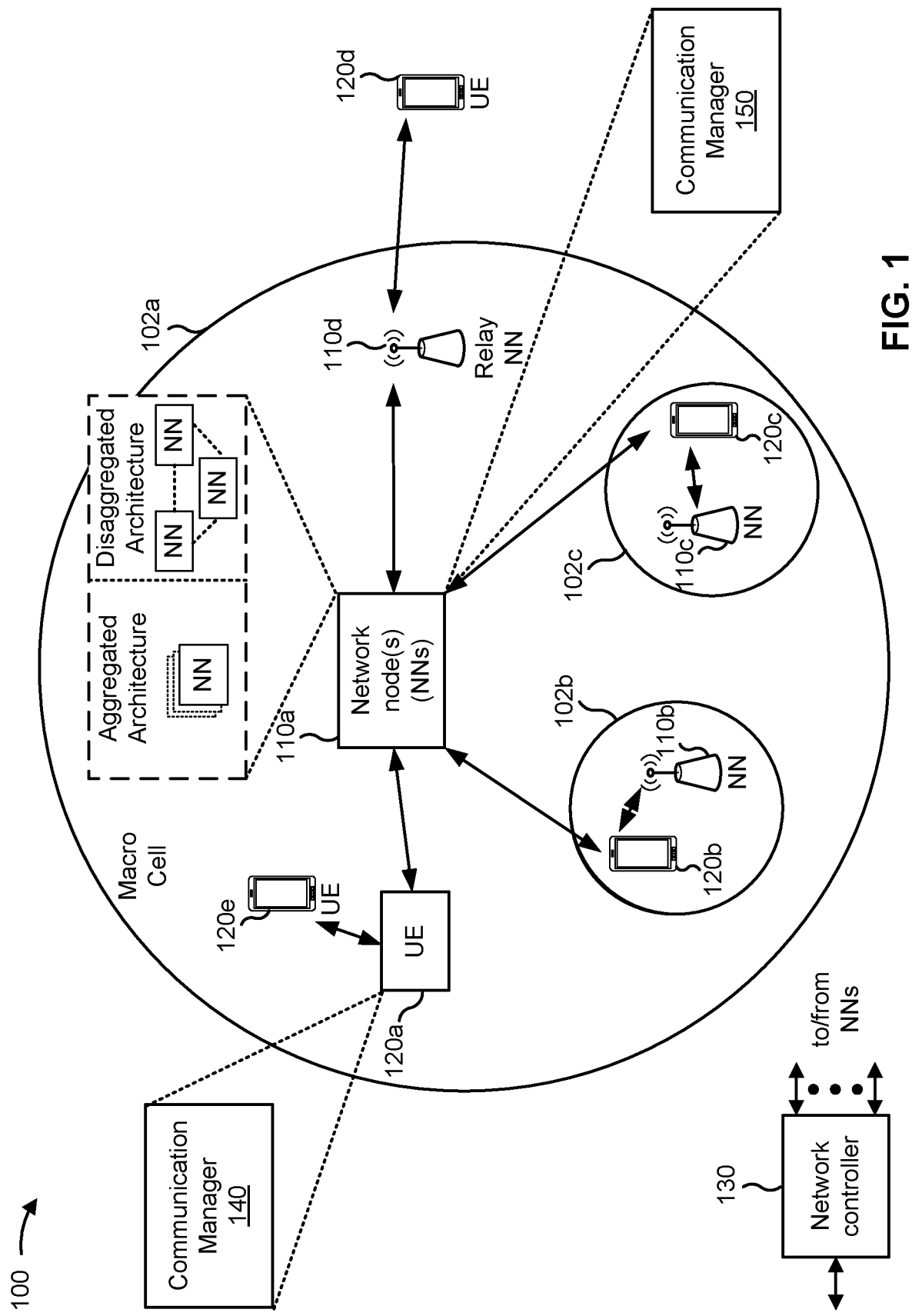
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node may include a communication manager 150. As described in more detail elsewhere herein, the communication manager 150 may receive, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE; and perform a data transfer operation based at least in part on receiving the secondary node release request. As described in more detail elsewhere herein, the communication manager 150 may transmit, to a UE, a radio resource control reconfiguration communication comprising a multiple radio access technology dual connectivity configuration; receive a reconfiguration completion message that indicates a successful application of the multiple radio access technology dual connectivity configuration; and transmit a conditional handover configuration message to the UE that indicates a conditional handover configuration to be used by the UE. As described in more detail elsewhere herein, the communication manager 150 may transmit, to a UE, a first radio resource control reconfiguration communication comprising a conditional handover configuration; and transmit, to the UE, a second radio resource control reconfiguration communication comprising a conditional primary secondary cell group cell (PSCell) configuration, wherein the conditional PSCell configuration comprises a conditional PSCell addition configuration or a conditional PSCell change configuration. Additionally, or alternatively, the communication manager 150 may perform one or more other operations described herein.

In some aspects, the UE 120 may include a communication manager 140. As described in more detail elsewhere herein, the communication manager 140 may perform conditional handover monitoring measurements according to a conditional handover configuration; receive, from a source master node, a radio resource control reconfiguration communication comprising a multiple radio access technology dual connectivity configuration; and stop performing the conditional handover monitoring measurements based at least in part on the multiple radio access technology dual connectivity configuration. As described in more detail elsewhere herein, the communication manager 140 may receive, from a source master node, a first radio resource control reconfiguration communication comprising a conditional handover configuration; receive, from a source master node, a second radio resource control reconfiguration communication comprising a conditional primary PSCell configuration, wherein the conditional PSCell configuration comprises a conditional PSCell addition configuration or a conditional PSCell change configuration; perform conditional handover monitoring measurements according to the conditional handover configuration and performing conditional PSCell monitoring measurements according to the conditional PSCell configuration; and stop performing the conditional handover monitoring measurements based at least in part on an occurrence of a trigger event corresponding to the conditional PSCell configuration. Additionally, or alternatively, the communication manager 140 may perform one or more other operations described herein.

As indicated above, FIG. 1 is provided as an example. Other examples may differ from what is described with regard to FIG. 1.

Figure 2:
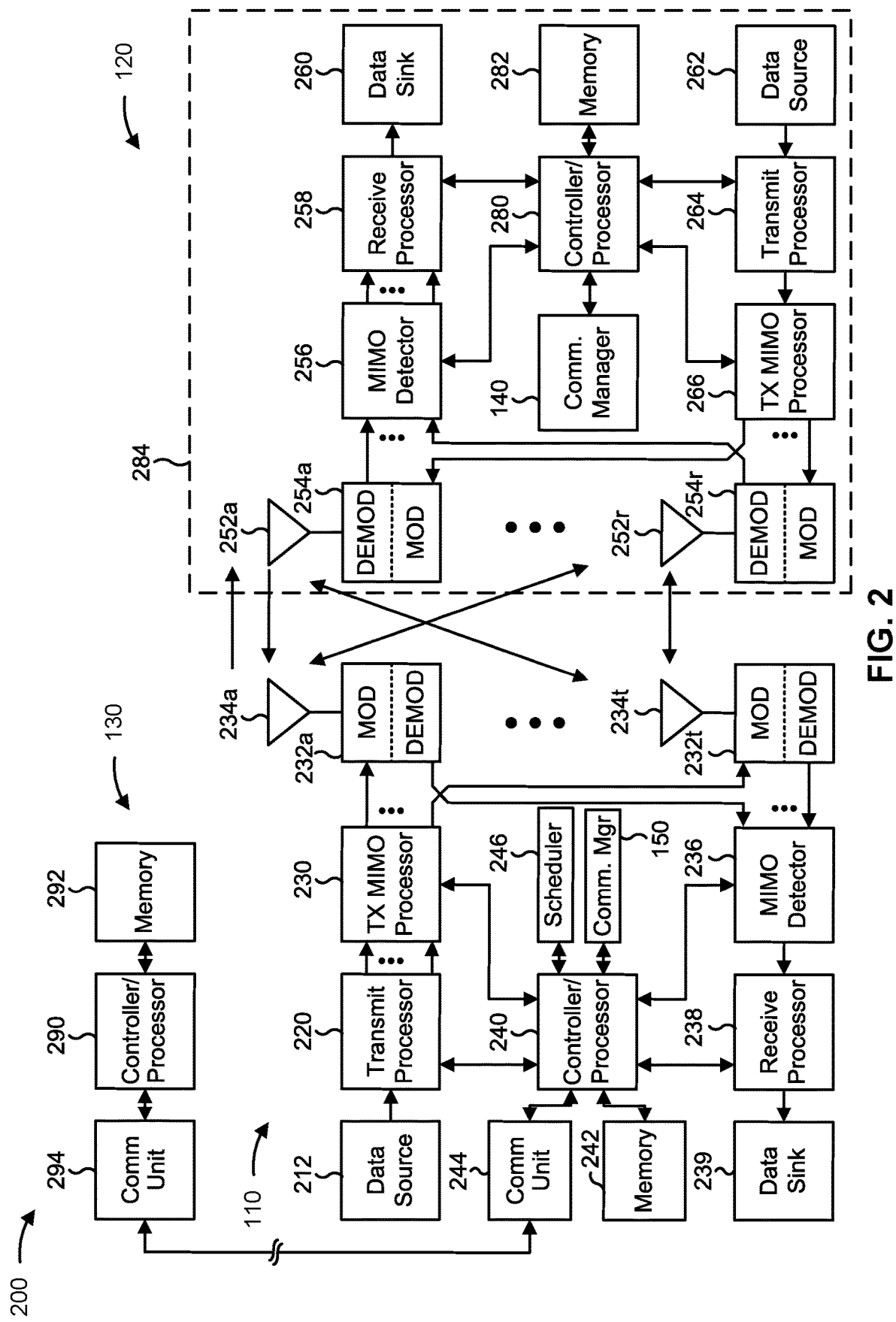
FIG. 2 is a diagram illustrating an example of a base station in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-15).

The controller/processor 240 of the network node 110, the controller/processor 280 of the UE 120, and/or any other component(s) of FIG. 2 may perform one or more techniques associated with conditional handover with multiple radio access technology dual connectivity, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the network node includes means for receiving, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE; and/or means for performing a data transfer operation based at least in part on receiving the secondary node release request. In some aspects, the network node includes means for transmitting, to a UE, a radio resource control reconfiguration communication comprising a multiple radio access technology dual connectivity configuration; means for receiving a reconfiguration completion message that indicates a successful application of the multiple radio access technology dual connectivity configuration; and/or means for transmitting a conditional handover configuration message to the UE that indicates a conditional handover configuration to be used by the UE. In some aspects, the network node includes means for transmitting, to a UE, a first radio resource control reconfiguration communication comprising a conditional handover configuration; and/or means for transmitting, to the UE, a second radio resource control reconfiguration communication comprising a conditional PSCell configuration, wherein the conditional PSCell configuration comprises a conditional PSCell addition configuration or a conditional PSCell change configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for performing conditional handover monitoring measurements according to a conditional handover configuration; means for receiving, from a source master node, a radio resource control reconfiguration communication comprising a multiple radio access technology dual connectivity configuration; and/or means for stopping performing the conditional handover monitoring measurements based at least in part on the multiple radio access technology dual connectivity configuration. In some aspects, the UE includes means for receiving, from a source master node, a first radio resource control reconfiguration communication comprising a conditional handover configuration; means for receiving, from a source master node, a second radio resource control reconfiguration communication comprising a conditional PSCell configuration, wherein the conditional PSCell configuration comprises a conditional PSCell addition configuration or a conditional PSCell change configuration; means for performing conditional handover monitoring measurements according to the conditional handover configuration and performing conditional PSCell monitoring measurements according to the conditional PSCell configuration; and/or means for stopping performing the conditional handover monitoring measurements based at least in part on an occurrence of a trigger event corresponding to the conditional PSCell configuration. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station. An example of a disaggregated base station architecture is described further in connection with FIG. 16.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
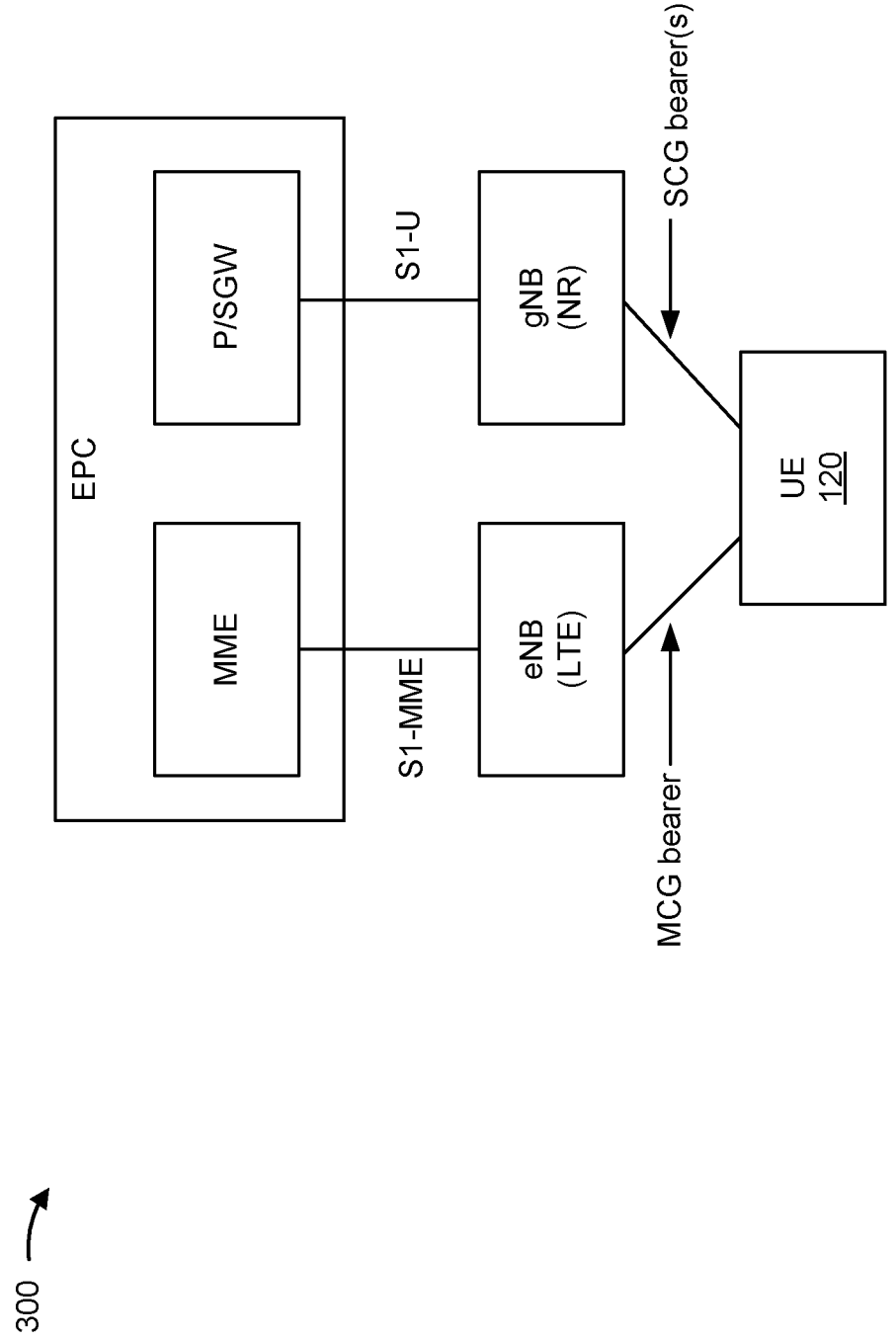
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), or another multiple RAT dual connectivity mode. The ENDC mode is sometimes referred to as an NR or 5G non-standalone (NSA) mode. Thus, as used herein, "dual connectivity mode" may refer to an ENDC mode, an NEDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and the UE 120 may communicate with the gNB via the SCG. In the illustrated example, the eNB may be a master node, and the gNB may be a secondary node. In other multiple radio access technology dual connectivity implementations, the master node and secondary node may be, or include, other types of network nodes, respectively. For example, the master node may be a gNB, the secondary node may be an eNB, the master node and/or the secondary node may be integrated access and backhaul (IAB) nodes, and/or the master node and/or the secondary node may be relay devices, among other examples. An MCG is a set of cells that are provided by the master node. The SCG is a set of cells that are provided by the secondary node. The cells in the MCG can be configured for carrier aggregation (CA), in which case there may be a primary cell (Pcell) and a set of secondary cells (SCells). Similarly, the cells in the SCG can be configured for CA so that there is a PSCell and a set of secondary SGC cells (SCG SCells).

In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As a UE moves (and/or as a network node moves), the UE may change cells that serve the UE. The procedure for changing to a different PCell is called handover, the procedure for adding a PSCell is called PSCell addition, and the procedure for changing a PSCell is called PSCell change. If a PSCell provided by a different secondary node is added, a secondary node addition procedure may be used.

In some cases, a UE operating in a multiple radio access technology dual connectivity mode may be configured with conditional handover. In conditional handover, the network configures a UE with one or more triggering conditions for when handover should be executed. For example, a conditional handover trigger condition may include detection of a specified value of a channel measurement and/or satisfaction of a threshold by a channel measurement, among other examples. Multiple candidate target cells may be prepared in multiple target network nodes and, when one or more triggering conditions are satisfied, the UE may perform the handover without further order from the network. Using conditional handover, handover commands may be sent before radio conditions become poor, thereby increasing the chance of successful handover.

In association with a conditional handover procedure, a target master node may decide to keep the source secondary node, change the source secondary node, or release the source secondary node. Although wireless communication standards specify how secondary node-terminated data bearers are to be handled in a case in which the target master node releases the secondary node, the handling of secondary node-terminated data bearers in scenarios in which the target master node keeps or changes the secondary node in the same manner as in scenarios in which the secondary node is released may result in lost data transfers or other network inefficiencies. Additionally, when a UE that is monitoring conditional handover according to a conditional handover configuration is configured with a multiple radio access technology dual connectivity configuration, a conditional PSCell addition configuration, and/or a conditional PSCell change configuration, the MCG configuration can change as a result. Continuing to monitor conditional handover according to the initial conditional handover configuration can lead to inaccurate measurement results, which may reduce the ability of the UE to appropriately determine triggering conditions, thereby leading to failures to perform conditional handover, conditional PSCell addition, or conditional PSCell change before deterioration of radio connections.

Some aspects of the techniques and apparatuses described herein may provide for handling secondary node-terminated data bearers in scenarios in which a target master node keeps or changes the secondary node. For example, in some aspects, a network node may receive, from a source master node, a secondary node release request corresponding to a conditional handover operation associated with a UE operating in accordance with multiple radio access technology dual connectivity, where the secondary node release request indicates that the network node is to continue to be a secondary node associated with the UE or that a target secondary node is to be the secondary node associated with the UE. Based at least in part on receiving the secondary node release request, the network node may perform a data transfer operation including, for example, stopping an early data forwarding process and initiating a late data forwarding process. In this way, the network may be configured to appropriately handle secondary node-terminated bearers, thereby improving network efficiency and decreasing the chance of lost communications.

Some aspects of the techniques and apparatuses described herein may provide procedures for handling conditional handover when a UE is configured with a multiple radio access technology dual connectivity configuration, a conditional PSCell addition configuration, and/or a conditional PSCell change configuration. For example, a network node may receive a reconfiguration completion message that indicates a successful application of the multiple radio access technology dual connectivity configuration and may transmit a conditional handover configuration message to the UE that indicates a conditional handover configuration to be used by the UE. In some aspects, a UE may receive, from a source master node, a radio resource control reconfiguration communication that includes a conditional PSCell configuration (e.g., a conditional PSCell addition configuration or a conditional PSCell change configuration). The UE may perform conditional handover monitoring measurements according to the conditional handover configuration and conditional PSCell monitoring measurements according to the conditional PSCell configuration. The UE may stop performing the conditional handover monitoring measurements based at least in part on an occurrence of a trigger event corresponding to the conditional PSCell configuration. In this way, some aspects may enable a UE to adapt to a change in configurations that may affect a conditional handover procedure, thereby improving network efficiency and decreasing the chance of lost communications.

As indicated above, FIG. 3 is provided as an example. Other examples may differ from what is described with respect to FIG. 3.

Figure 4:
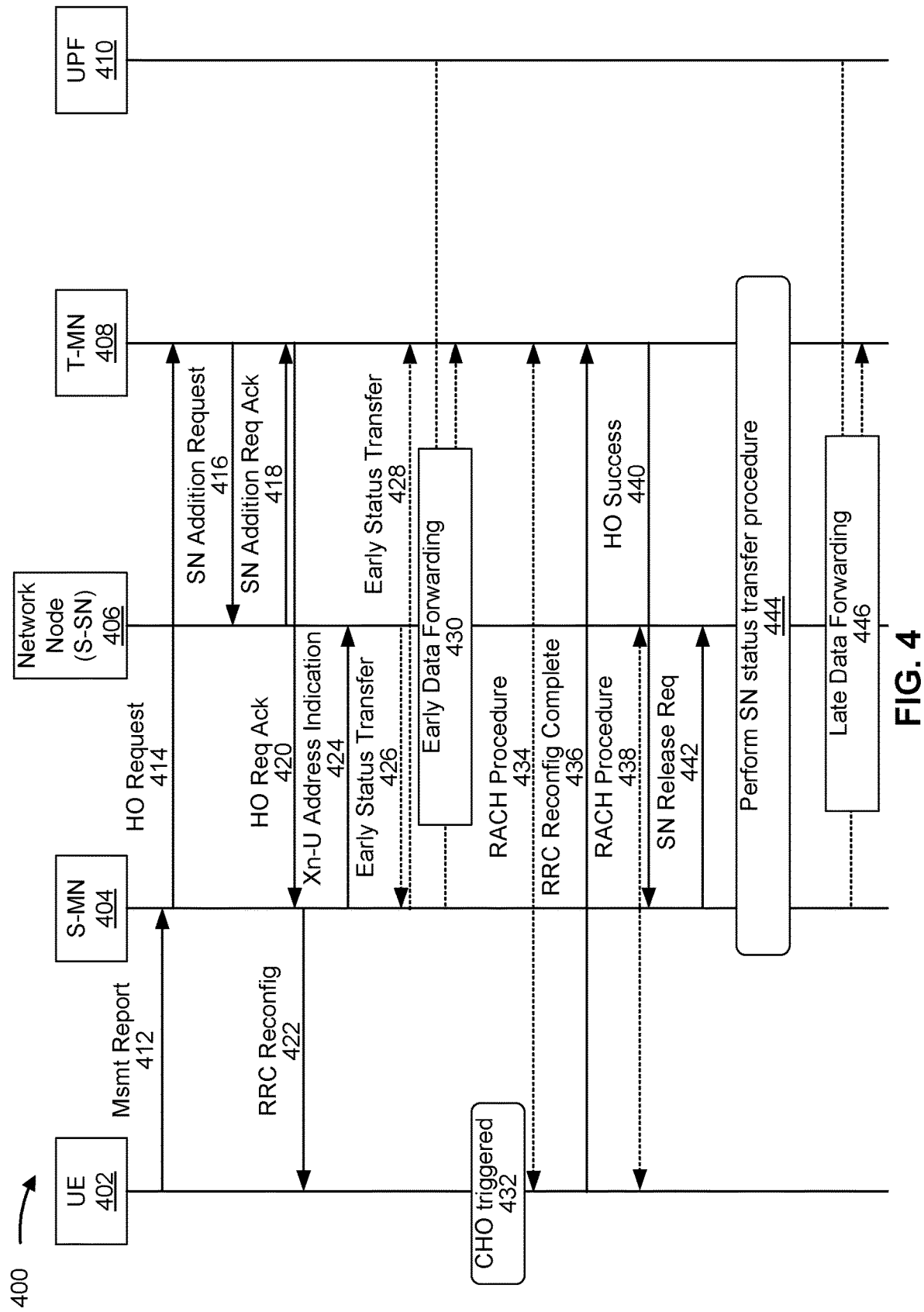
FIGS. 4-8 are diagrams illustrating examples associated with conditional handover with multiple radio access technology dual connectivity, in accordance with the present disclosure.

FIG. 4 is a diagram illustrating an example 400 associated with conditional handover with multiple radio access technology dual connectivity, in accordance with the present disclosure. As shown in FIG. 4, a UE 402, a source master node 404 (shown as "S-MN"), network node 406 (also referred to as a source secondary node and shown as "network node (S-SN)"), and a target master node 408 (shown as "T-MN") may communicate with one another. One or more of the source master node 404, source secondary node 406, and target master node 408 may facilitate communicating data between the UE 402 and a user plane function 410 (shown as "UPF") of a wireless communication network. In example 400, the UE 402 may be operating in a multiple radio access technology dual connectivity mode and may be configured with a conditional handover configuration.

As shown by reference number 412, the UE 402 may transmit a measurement report to the source master node 404. In response to receiving the measurement report, as shown by reference number 414, the source master node 404 may transmit a handover request to the target master node 408. The handover request may indicate a UE identifier (ID), a secondary node ID, and UE context information associated with the source secondary node (e.g., using one or more application protocol level IDs). The handover request also may indicate a target cell ID and a conditional handover indicator that indicates that a conditional handover procedure has been initiated.

In example 400, the target master node 408 may decide to keep the source secondary node 406 and, as shown by reference number 416, may transmit a secondary node addition request (shown as "SN addition request") to the source secondary node 406. The secondary node addition request may include one or more indicators that reference the UE context information associated with the source secondary node. The secondary node addition request also may include a conditional handover indicator that indicates that the conditional handover procedure has been initiated. As shown by reference number 418, the source secondary node 406 may transmit a secondary node addition request acknowledgment (shown as "SN addition req ack") to the target master node 408. The secondary node addition request acknowledgment may indicate data forwarding addresses for master node-terminated bearers that are to be moved to the source secondary node 406 during the handover.

As shown by reference number 420, the source secondary node 406 may transmit a handover request acknowledgment (shown as "HO req ack") to the source master node 404. The handover request acknowledgment may include a transparent container containing a handover command to be transmitted to the UE 402. The handover request acknowledgment may indicate data forwarding addresses for data bearers such as, for example, data bearers (master node-terminated bearers or secondary node-terminated bearers) that are to be moved to the target master node 408 and/or master node-terminated bearers that are to be moved to the source secondary node 406. The data forwarding addresses indicated by the handover request acknowledgment may be used for early and late data forwarding. The handover request acknowledgment may indicate that the UE context associated with the source secondary node 406 is to be kept.

As shown by reference number 422, the source master node 404 may transmit, and the UE 402 may receive, a radio resource control reconfiguration communication (shown as "RRC Reconfig"). As shown by reference number 424, the source master node 404 may transmit, and the source secondary node 406 may receive, an Xn-U address indication. The Xn-U address indication is an address indication associated with Xn application protocol (e.g., corresponding to an Xn interface) that indicates data forwarding addresses for secondary node-terminated bearers that are to be moved to the target master node 408. The Xn-U address indication also may include a conditional handover indicator. In some aspects, separate Xn-U address indication procedures may be used to provide different forwarding addresses of procedures with different target master nodes.

As shown by reference number 426, the source secondary node 406 may transmit an early status transfer to the source master node 404 and, as shown by reference number 428, the source secondary node 406 may transmit an early status transfer to the target master node 408. As shown by reference number 430, the source secondary node 406 may perform early data forwarding. Early data forwarding is a process in which the source secondary node 406 forwards data received from the UPF 410 and destined for the UE 402 to the target master node 408 in advance of being successfully connected to the UE 402.

As shown by reference number 432, conditional handover may be triggered and, as shown by reference number 434, in response to the triggering of conditional handover, the UE 402 and the target master node 408 may perform a random access channel procedure to facilitate the handover. Upon successfully completing the random access channel procedure, the UE 402 may transmit a radio resource control reconfiguration completion message (shown as "RRC reconfig complete") to the target master node 408, as shown by reference number 436. As shown by reference number 438, the UE 402 and the source secondary node 406 may perform a random access channel procedure to further facilitate the handover. As shown by reference number 440, the target master node 408 may transmit a handover success message (shown as "HO success") to the source master node 404.

In response to receiving the handover success message, the source master node 404 may transmit, and the source secondary node 406 may receive, a secondary node release request (shown as "SN release req"), as shown by reference number 442. The secondary node release request may indicate that the source secondary node 406 is to continue to be a secondary node associated with the UE 402. The secondary node release request may include an indication that indicates that a UE context associated with the source secondary node is to be maintained after the conditional handover operation.

Based at least in part on receiving the secondary node release request, the source secondary node 406 may perform a data transfer operation. As shown by reference number 444, for example, the source secondary node 406 may perform a secondary node status transfer procedure. In some aspects, the source secondary node 406 may perform the data transfer operation by stopping an early data forwarding process and/or initiating a late data forwarding process. In some aspects, the source secondary node 406 may receive an indication (e.g., the Xn-U address indication) that indicates a set of secondary-node-terminated data bearers that are not to be moved to the target master node 408. The source secondary node 406 may perform the data transfer operation by using the set of secondary-node-terminated data bearers to communicate with the UE based at least in part on a successful completion of a random access channel procedure to connect to the UE. In some aspects, the source secondary node 406 may receive an indication (e.g., the Xn-U address indication) that indicates a set of secondary-node-terminated data bearers that are to be moved to the target master node 408, and the source secondary node 406 may perform the data transfer operation by stopping using the set of secondary-node-terminated data bearers for data transmissions to the UE 402. As shown by reference number 446, the source secondary node 406 may perform late data forwarding, which may be considered a part of performing the data transfer operation in some aspects.

As indicated above, FIG. 4 is provided as an example. Other examples may differ from what is described with respect to FIG. 4.

Figure 5:
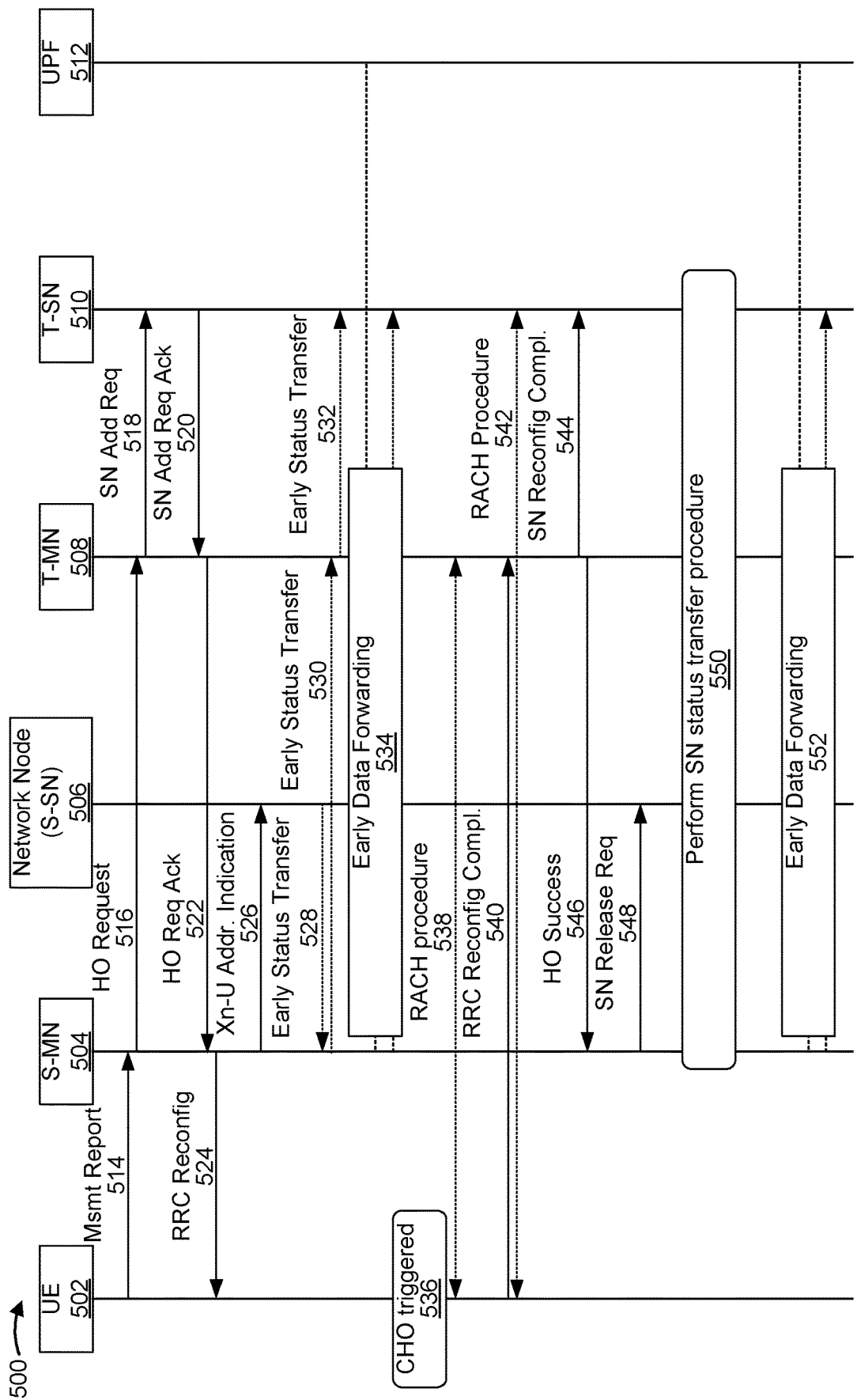

FIG. 5 is a diagram illustrating an example 500 associated with conditional handover with multiple radio access technology dual connectivity, in accordance with the present disclosure. Example 500 may be similar to example 400, but in example 500, the target master node decides to change the secondary node. As shown in FIG. 5, a UE 502, a source master node 504 (shown as "S-MN"), source secondary node 506 (shown as "network node (S-SN)"), a target master node 508 (shown as "T-MN"), and a target secondary node 510 (shown as "T-SN") may communicate with one another. One or more of the source master node 504, source secondary node 506, target master node 508, and target secondary node 510 may facilitate communicating data between the UE 502 and a user plane function 512 (shown as "UPF") of a wireless communication network. In example 500, the UE 502 may be operating in a multiple radio access technology dual connectivity mode and may be configured with a conditional handover configuration.

As shown by reference number 514, the UE 502 may transmit a measurement report to the source master node 504. In response to receiving the measurement report, as shown by reference number 516, the source master node 504 may transmit a handover request to the target master node 508. The handover request may indicate a UE ID, a secondary node ID, and UE context information associated with the source secondary node (e.g., using one or more application protocol level IDs). The handover request also may indicate a target cell ID and a conditional handover indicator that indicates that a conditional handover procedure has been initiated.

In example 500, the target master node 508 may decide to change the secondary node and, as shown by reference number 518, may transmit a secondary node addition request (shown as "SN addition request") to the target secondary node 510. The secondary node addition request may include a conditional handover indicator that indicates that the conditional handover procedure has been initiated. As shown by reference number 520, the target secondary node 510 may transmit a secondary node addition request acknowledgment (shown as "SN addition req ack") to the target master node 508. The secondary node addition request acknowledgment may indicate data forwarding addresses for master node-terminated bearers that are to be moved to the target secondary node 510 during the handover.

As shown by reference number 522, the target master node 508 may transmit a handover request acknowledgment (shown as "HO req ack") to the source master node 504. The handover request acknowledgment may include a transparent container containing a handover command to be transmitted to the UE 502. The handover request acknowledgment may indicate data forwarding addresses for data bearers such as, for example, data bearers (master node-terminated bearers or secondary node-terminated bearers) that are to be moved to the target master node 508 and/or data bearers (master node-terminated bearers or secondary node-terminated bearers) that are to be moved to the target secondary node 510. The data forwarding addresses indicated by the handover request acknowledgment may be used for early and late data forwarding.

As shown by reference number 526, the source master node 504 may transmit, and the source secondary node 506 may receive, an Xn-U address indication that indicates data forwarding addresses for secondary node-terminated bearers that are to be moved to the target master node 508 or target secondary node 510. The Xn-U address indication also may include a conditional handover indicator. As shown by reference number 528, the source secondary node 506 may transmit an early status transfer to the source master node 504 and, as shown by reference number 530, the source secondary node 506 may transmit an early status transfer to the target master node 508. The target master node 508 may transmit an early status transfer to the target secondary node 510, as shown by reference number 532. As shown by reference number 534, the source secondary node 506 may perform early data forwarding.

As shown by reference number 536, conditional handover may be triggered and, as shown by reference number 538, in response to the triggering of conditional handover, the UE 502 and the target master node 508 may perform a random access channel procedure to facilitate the handover. Upon successfully completing the random access channel procedure, the UE 502 may transmit a radio resource control reconfiguration completion message (shown as "RRC recon-fig complete") to the target master node 508, as shown by reference number 540. As shown by reference number 542, the UE 402 and the target secondary node 510 may perform a random access channel procedure to further facilitate the handover. As shown by reference number 544, the target master node 508 may transmit a secondary node reconfiguration completion message (shown as "SN reconfig compl.") to the target secondary node 510. As shown by reference number 546, the target master node 508 may transmit a handover success message (shown as "HO success") to the source master node 504.

In response to receiving the handover success message, the source master node 504 may transmit, and the source secondary node 506 may receive, a secondary node release request (shown as "SN release req"), as shown by reference number 548. Based at least in part on receiving the secondary node release request, the source secondary node 506 may perform a data transfer operation. As shown by reference number 550, for example, the source secondary node 506 may perform a secondary node status transfer procedure. In some aspects, the source secondary node 506 may perform the data transfer operation by stopping an early data forwarding process and/or initiating a late data forwarding process. In some aspects, the source secondary node 506 may receive an indication (e.g., the Xn-U address indication) that indicates a set of secondary-node-terminated data bearers that are to be moved to the target master node 508, and the source secondary node 506 may perform the data transfer operation by stopping using the set of secondary-node-terminated data bearers for data transmissions to the UE 502. As shown by reference number 552, the source secondary node 506 may perform late data forwarding, which may be considered a part of performing the data transfer operation in some aspects.

As indicated above, FIG. 5 is provided as an example. Other examples may differ from what is described with respect to FIG. 5.

Figure 6:
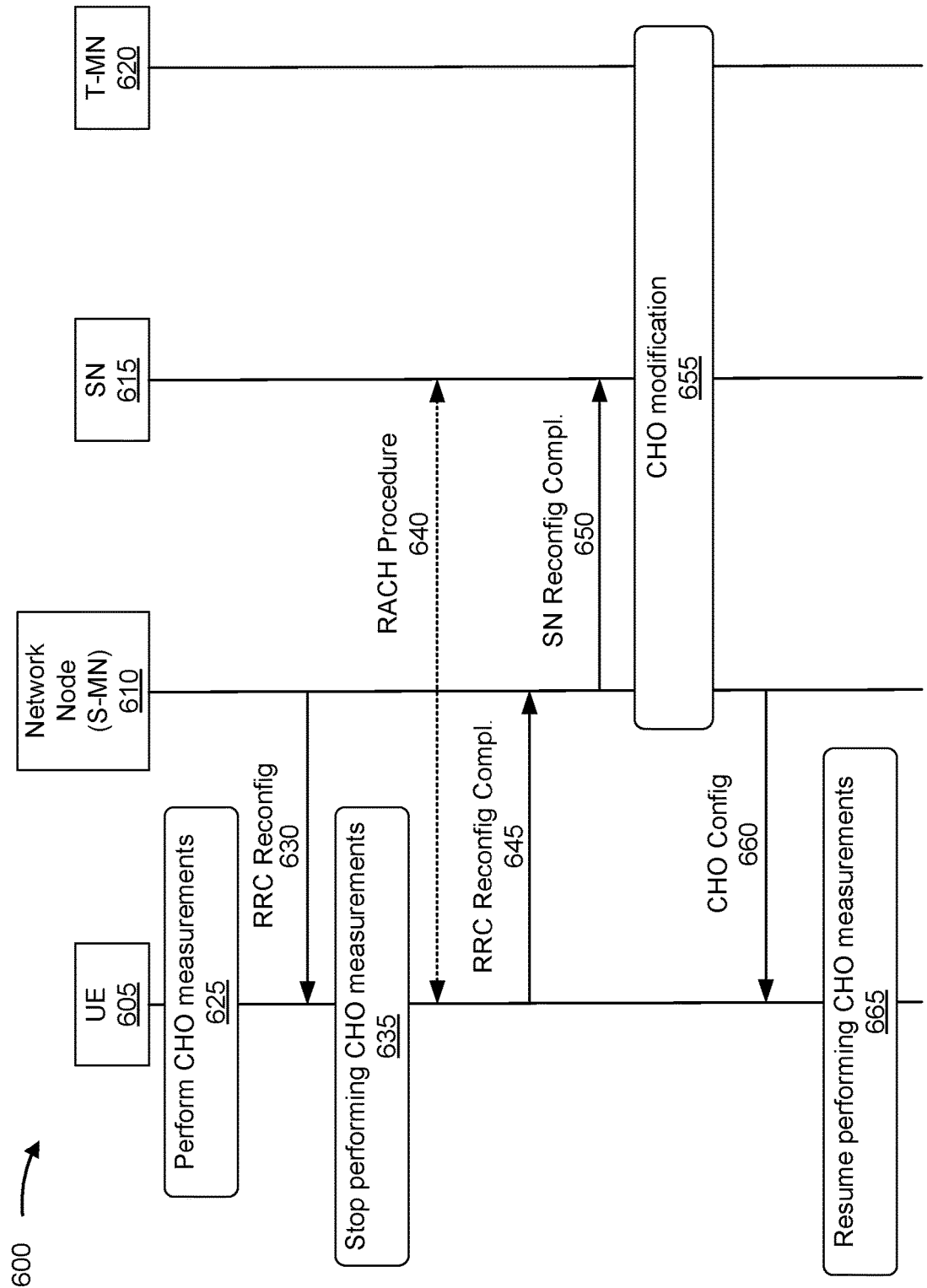

FIG. 6 is a diagram illustrating an example 600 associated with conditional handover with multiple radio access technology dual connectivity, in accordance with the present disclosure. As shown in FIG. 6, a UE 605, a source master node 610 (shown "network node (S-MN)"), a secondary node 615 (shown as "SN"), and a target master node 620 (shown as "T-MN") may communicate with one another.

As shown by reference number 625, the UE 605 may perform conditional handover measurements according to a conditional handover configuration. As shown by reference number 630, the source master node 610 may transmit, and the UE 605 may receive, a radio resource control reconfiguration communication (shown as "RRC reconfig"). The radio resource control reconfiguration communication may include a multiple radio access technology dual connectivity configuration. As shown by reference number 635, the UE 605 may stop performing the conditional handover monitoring measurements. The UE 605 may stop performing the conditional handover monitoring measurements based at least in part on the multiple radio access technology dual connectivity configuration.

As shown by reference number 640, the UE 605 and the secondary node 615 may perform a random access channel procedure. Upon successful completion of the random access channel procedure, the UE 605 may transmit, and the source master node 610 may receive, a radio resource control reconfiguration completion message (shown as "RRC reconfig compl."), as shown by reference number 645. The radio resource control reconfiguration completion message may indicate a successful application of the multiple radio access technology dual connectivity configuration. As shown by reference number 650, the source master node 610 may transmit a secondary node reconfiguration completion message (shown as "SN reconfig compl.") to the secondary node 615.

As shown by reference number 655, the source master node 610 may perform a conditional handover configuration modification procedure associated with one or more target master nodes (e.g., the target master node 620) to obtain an updated conditional handover configuration. In some aspects, for example, the source master node 610 may perform the conditional handover configuration modification procedure based at least in part on using the multiple radio access technology dual connectivity configuration as a source configuration of the conditional handover configuration modification procedure.

As shown by reference number 660, the source master node 610 may transmit, and the UE 605 may receive, a conditional handover configuration message (shown as "CHO config"). The conditional handover configuration message may indicate a conditional handover configuration to be used by the UE. In some aspects, the conditional handover configuration message may include the updated conditional handover configuration to be used by the UE. In some aspects, the conditional handover configuration message may indicate that the UE is to resume using the initial conditional handover configuration. As shown by reference number 665, the UE 605 may resume performing conditional handover measurements. For example, based on the conditional handover configuration message, the UE 605 may perform conditional handover monitoring measurements according to the updated conditional handover configuration or may perform conditional handover monitoring measurements according to the initial conditional handover configuration.

As indicated above, FIG. 6 is provided as an example. Other examples may differ from what is described with respect to FIG. 6.

Figure 7:
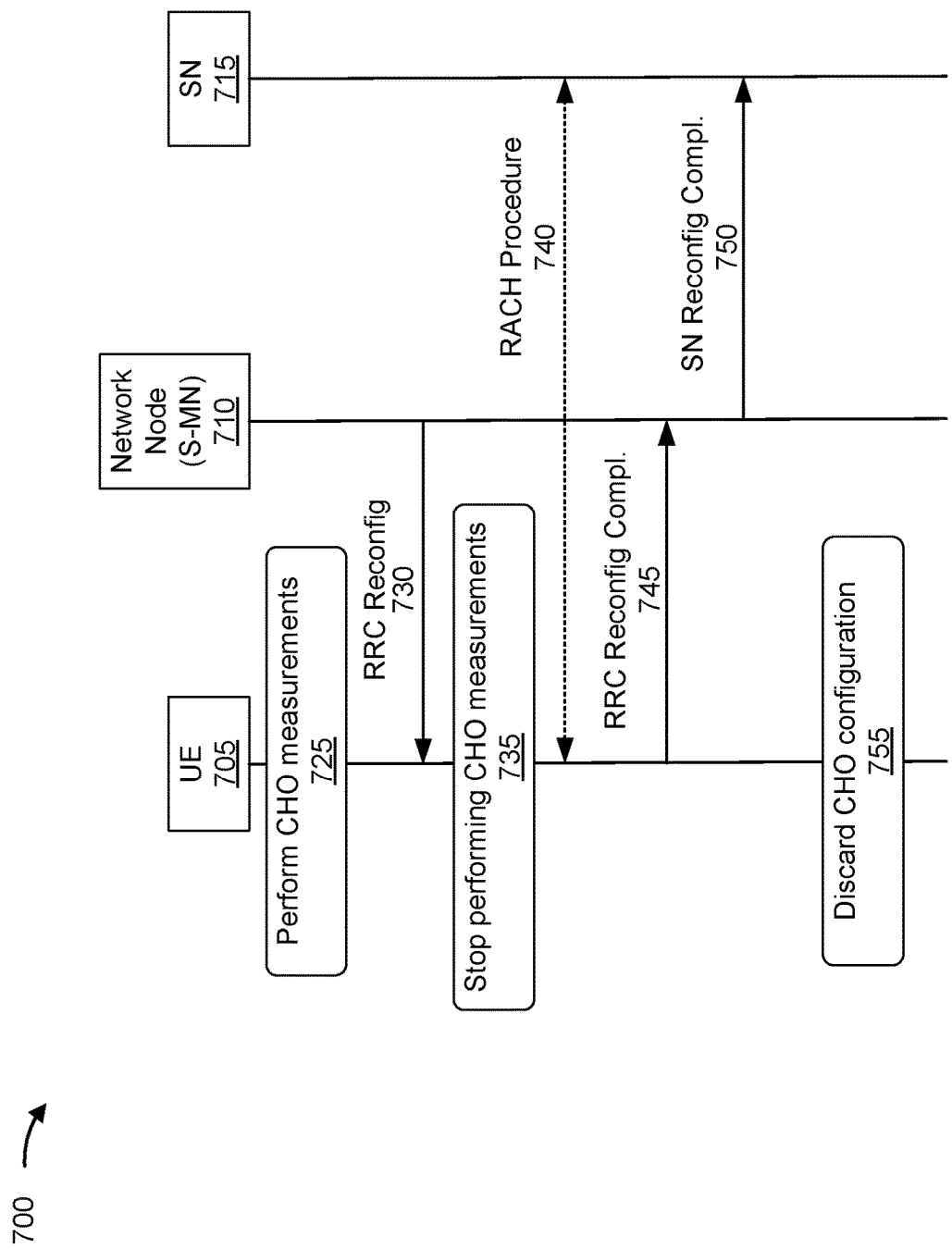

FIG. 7 is a diagram illustrating an example 700 associated with conditional handover with multiple radio access technology dual connectivity, in accordance with the present disclosure. As shown in FIG. 7, a UE 705, a source master node 710 (shown "network node (S-MN)"), and a secondary node 715 (shown as "SN") may communicate with one another.

As shown by reference number 725, the UE 705 may perform conditional handover measurements according to a conditional handover configuration. As shown by reference number 730, the source master node 710 may transmit, and the UE 705 may receive, a radio resource control reconfiguration communication (shown as "RRC reconfig"). The radio resource control reconfiguration communication may include a multiple radio access technology dual connectivity configuration. As shown by reference number 735, the UE 705 may stop performing the conditional handover monitoring measurements. The UE 705 may stop performing the conditional handover monitoring measurements based at least in part on the multiple radio access technology dual connectivity configuration.

As shown by reference number 740, the UE 705 and the secondary node 715 may perform a random access channel procedure. For example, in some aspects, the UE 705 may perform a random access channel procedure associated with a PSCell. Upon successful completion of the random access channel procedure, the UE 705 may transmit, and the source master node 710 may receive, a radio resource control reconfiguration completion message (shown as "RRC reconfig compl."), as shown by reference number 745. The radio resource control reconfiguration completion message may indicate a successful application of the multiple radio access technology dual connectivity configuration. As shown by reference number 750, the source master node 710 may transmit a secondary node reconfiguration completion message (shown as "SN reconfig compl.") to the secondary node 715.

As shown by reference number 755, the UE 705 may discard the conditional handover configuration. For example, in some aspects, the UE 705 may discard the conditional handover configuration in response to accessing the PSCell via the random access channel procedure. In some aspects, the UE 705 may resume performing the conditional handover monitoring measurements according to the conditional handover configuration in response to a failure of the random access channel procedure.

As indicated above, FIG. 7 is provided as an example. Other examples may differ from what is described with respect to FIG. 7.

Figure 8:
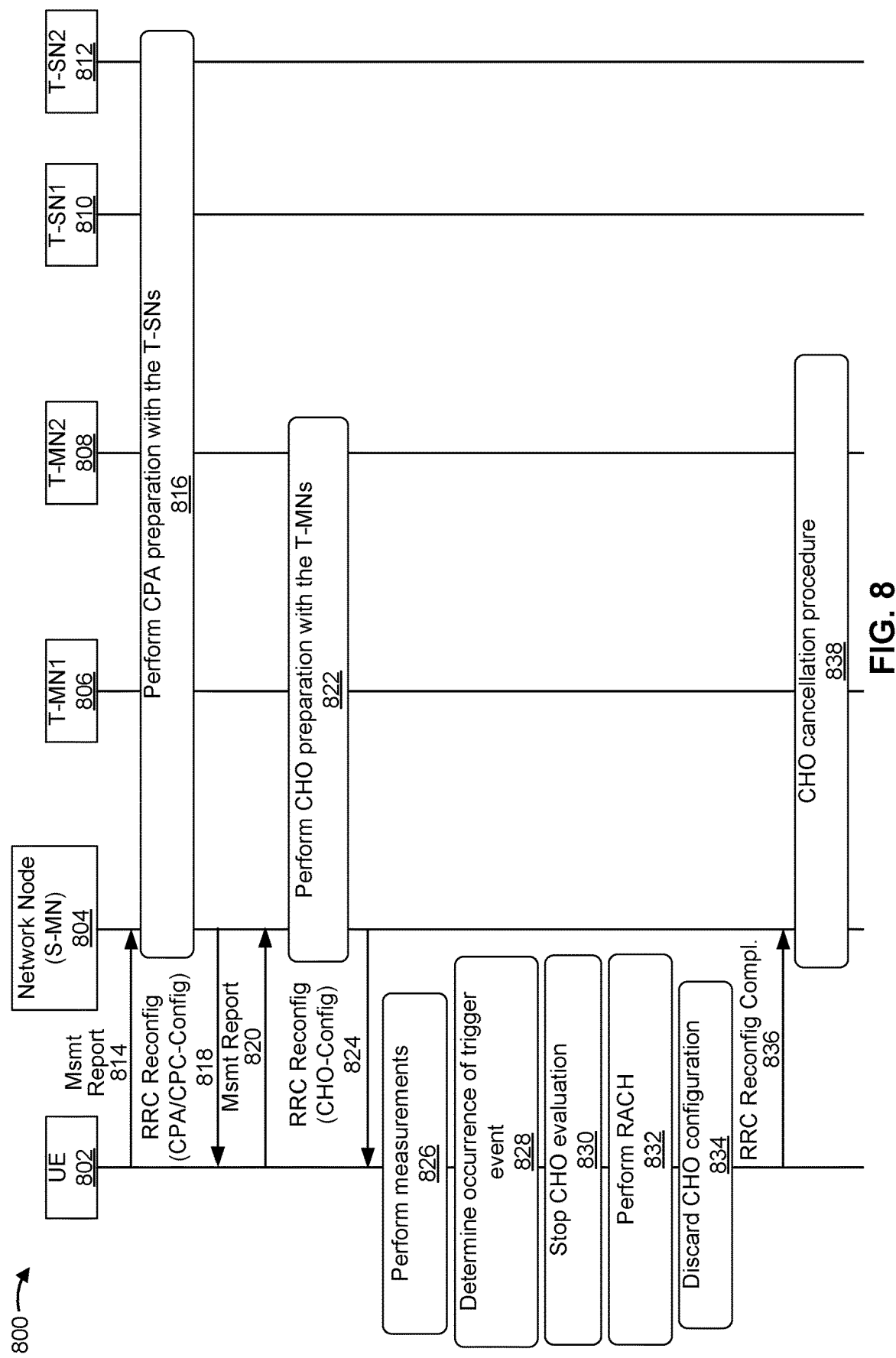

FIG. 8 is a diagram illustrating an example 800 associated with conditional handover with multiple radio access technology dual connectivity, in accordance with the present disclosure. As shown in FIG. 8, a UE 802, a source master node 804 (shown "network node (S-MN)"), first target master node 806 (shown as "T-MN1"), a second target master node 808 (shown as "T-MN2"), a first target secondary node 810 (shown as "T-SN1"), and a second target secondary node 812 (shown as "T-SN2") may communicate with one another.

As shown by reference number 814, the UE 802 may transmit a measurement report to the source master node 804. As shown by reference number 816, the source master node 804 may perform conditional PSCell additional preparations associated with the target secondary node 1 and the target secondary node 2. As shown by reference number 818, the source master node 804 may transmit, and the UE 802 may receive, a radio resource control reconfiguration communication that includes a conditional PSCell configuration (shown as "RRC reconfig (CPA/CPC-config)"). The conditional PSCell configuration may include a conditional PSCell addition configuration or a conditional PSCell change configuration.

As shown by reference number 820, the UE 802 may transmit a measurement report to the source master node 804. In response to receiving the measurement report, the source master node 804 may perform conditional handover preparation with the target master node 806 and target master node 808, as shown by reference number 822. As shown by reference number 824, the source master node 804 may transmit, and the UE 802 may receive, a radio resource control reconfiguration communication that includes a conditional handover configuration (shown as "RRC reconfig (CHO-config)").

In some aspects, the radio resource control reconfiguration communication may include one or more indications corresponding, respectively, to one or more prepared target primary cells. Each indication may indicate whether the UE 802 is to keep or discard a conditional handover configuration associated with a respective prepared target primary cell upon completing a PSCell addition procedure. In some aspects, an indication of the one or more indications may indicate that the UE 802 is to keep the conditional handover configuration associated with the respective prepared target primary cell based at least in part on a target primary cell configuration corresponding to the respective prepared target primary cell being a full configuration. For example, in some aspects, the source master node 804 may receive, from a target master node, a handover request acknowledge message corresponding to the respective prepared target primary cell that includes an indication that the target primary cell configuration comprises a full configuration.

As shown by reference number 826, the UE 802 may perform measurements. For example, in some aspects, the UE 802 may perform conditional handover monitoring measurements according to the conditional handover configuration and conditional PSCell monitoring measurements according to the conditional PSCell configuration. As shown by reference number 828, the UE 802 may determine an occurrence of a trigger event corresponding to the conditional PSCell configuration. As shown by reference number 830, the UE 802 may stop performing the conditional handover monitoring measurements based at least in part the occurrence of the trigger event corresponding to the conditional PSCell configuration.

As shown by reference number 832, the UE 802 may perform a random access channel procedure associated with a PSCell corresponding to the occurrence of the trigger event. In some aspects, for example, the UE 802 may access the PSCell based at least in part on the random access channel procedure. In some aspects, the UE 802 may apply a multiple radio access technology dual connectivity configuration associated with the PSCell corresponding to the occurrence of the trigger event. As shown by reference number 834, the UE 802 may discard the conditional handover configuration in response to accessing the PSCell and applying a multiple radio access technology dual connectivity configuration. In such a case, as shown by reference number 836, the UE 802 may transmit a radio resource control reconfiguration complete message (shown as "RRC reconfig compl.") to the source master node 804. Upon receiving the radio resource control reconfiguration complete message, as shown by reference number 838, the source master node 804 may initiate a conditional handover cancellation procedure with the target master nodes 806 and 808 to release the UE resources and the UE contexts at the target master nodes 806 and 808. In some aspects, the UE 802 may resume performing the conditional handover monitoring measurements according to the conditional handover configuration in response to a failure of the random access channel procedure.

As indicated above, FIG. 8 is provided as an example. Other examples may differ from what is described with respect to FIG. 8.

Figure 9:
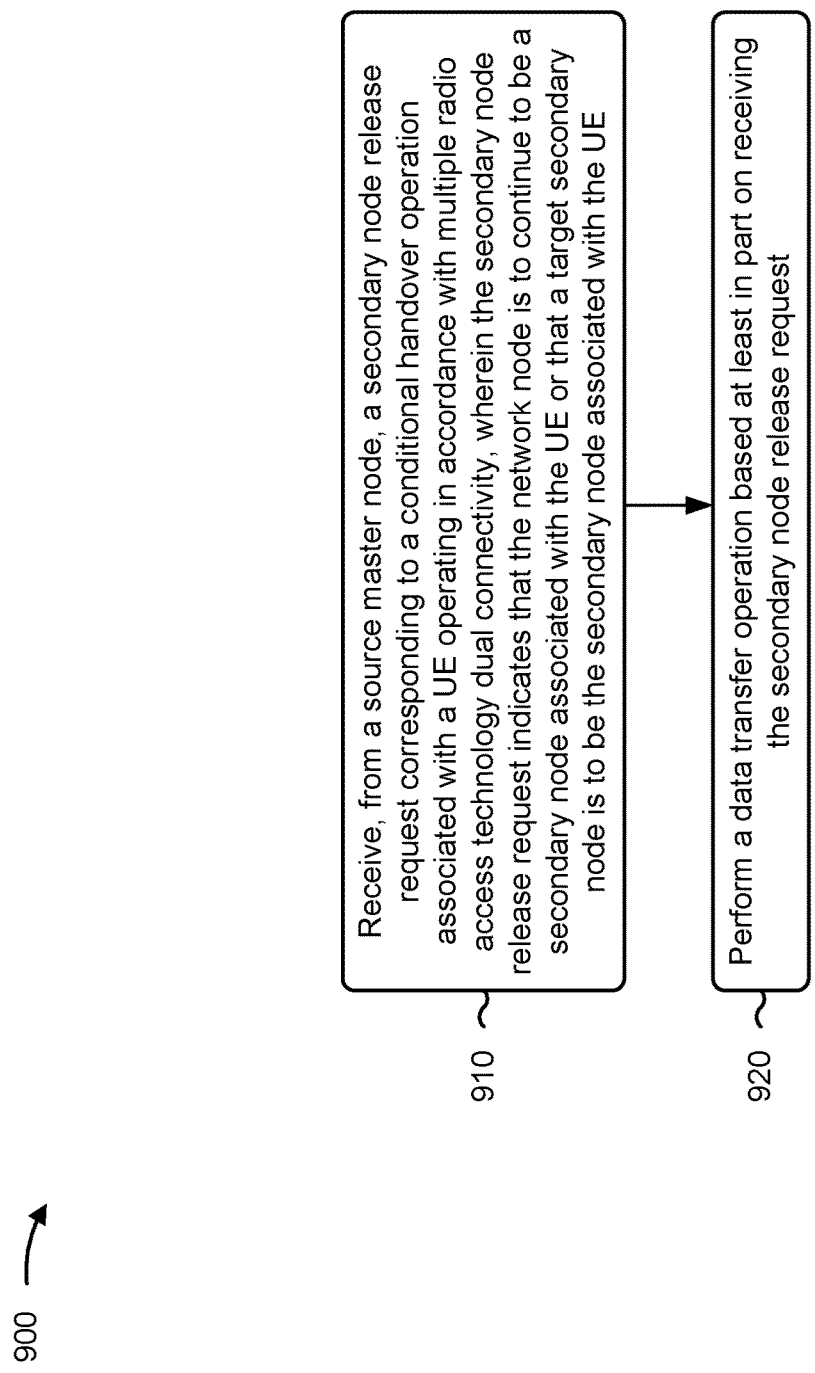
FIGS. 9-13 are diagrams illustrating example processes associated with conditional handover with multiple radio access technology dual connectivity, in accordance with the present disclosure.

FIG. 9 is a diagram illustrating an example process 900 performed, for example, by a network node, in accordance with the present disclosure. Example process 900 is an example where the network node (e.g., network node 406) performs operations associated with conditional handover with multiple radio access technology dual connectivity.

As shown in FIG. 9, in some aspects, process 900 may include receiving, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE (block 910). For example, the network node (e.g., using communication manager 150 and/or reception component 1502, depicted in FIG. 15) may receive, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE, as described above.

As further shown in FIG. 9, in some aspects, process 900 may include performing a data transfer operation based at least in part on receiving the secondary node release request (block 920). For example, the network node (e.g., using communication manager 150, reception component 1502, and/or transmission component 1504, depicted in FIG. 15) may perform a data transfer operation based at least in part on receiving the secondary node release request, as described above.

Process 900 may include additional aspects, such as any single aspect or any combination of aspects described below and/or in connection with one or more other processes described elsewhere herein.

In a first aspect, the secondary node release request includes an indication that indicates that a UE context is to be maintained after the conditional handover operation. In a second aspect, alone or in combination with the first aspect, performing the data transfer operation comprises stopping an early data forwarding process. In a third aspect, alone or in combination with one or more of the first and second aspects, performing the data transfer operation comprises initiating a late data forwarding process.

In a fourth aspect, alone or in combination with one or more of the first through third aspects, process 900 includes receiving an indication that indicates a set of secondary-node-terminated data bearers that are not to be moved to a target master node, and performing the data transfer operation includes using the set of secondary-node-terminated data bearers to communicate with the UE based at least in part on a successful completion of a random access channel procedure to connect to the UE. In a fifth aspect, alone or in combination with one or more of the first through fourth aspects, process 900 includes receiving an indication that indicates a set of secondary-node-terminated data bearers that are to be moved to a target master node, and performing the data transfer operation includes stopping using the set of secondary-node-terminated data bearers for data transmissions to the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
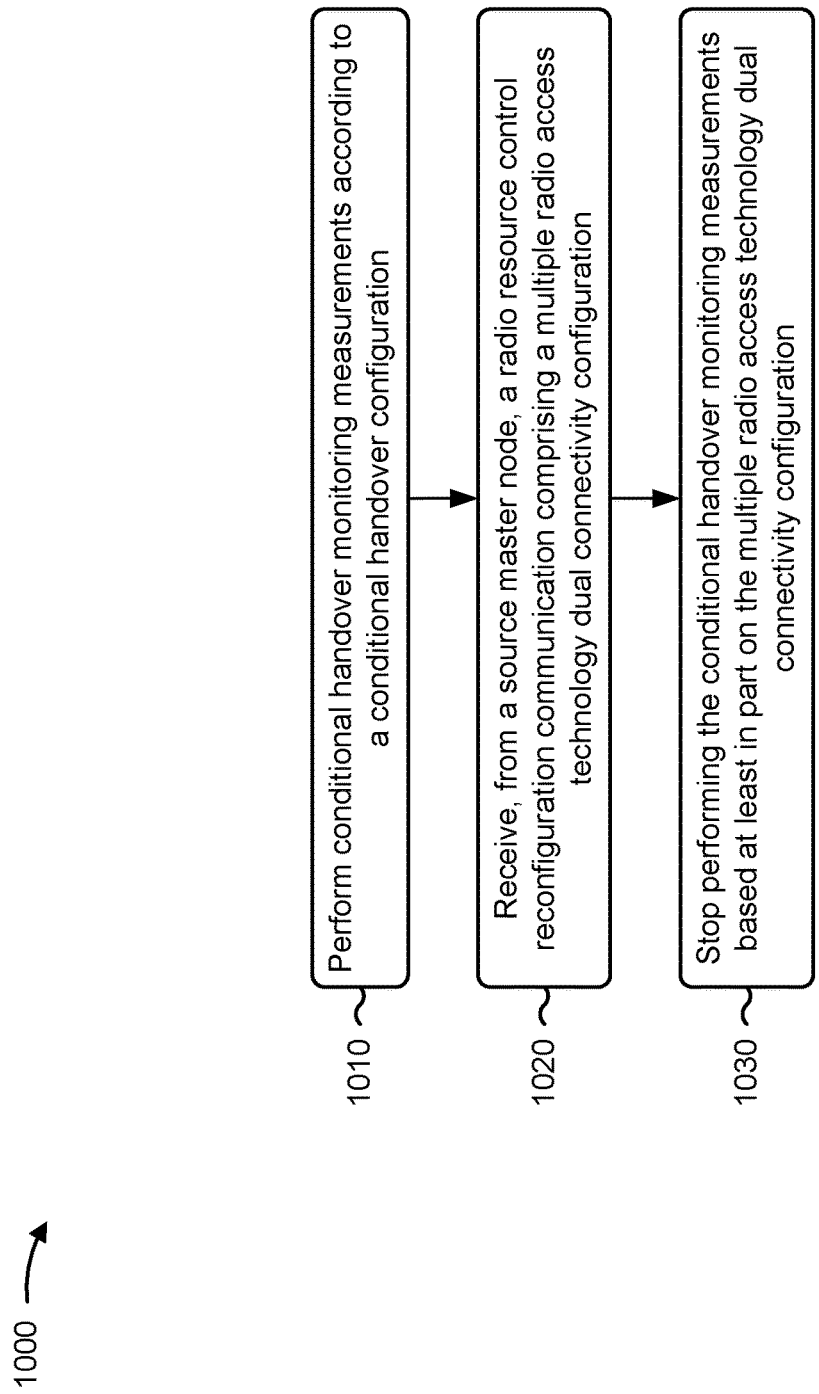

FIG. 10 is a diagram illustrating an example process 1000 performed, for example, by a UE, in accordance with the present disclosure. Example process 1000 is an example where the UE (e.g., UE 605 and/or UE 705) performs operations associated with conditional handover with multiple radio access technology dual connectivity.

As shown in FIG. 10, in some aspects, process 1000 may include performing conditional handover monitoring measurements according to a conditional handover configuration (block 1010). For example, the UE (e.g., using communication manager 140, the reception component 1402 and/or transmission component 1404, depicted in FIG. 14) may perform conditional handover monitoring measurements according to a conditional handover configuration, as described above.

As further shown in FIG. 10, in some aspects, process 1000 may include receiving, from a source master node, a radio resource control reconfiguration communication comprising a multiple radio access technology dual connectivity configuration (block 1020). For example, the UE (e.g., using communication manager 140 and/or reception component 1402, depicted in FIG. 14) may receive, from a source master node, a radio resource control reconfiguration communication comprising a multiple radio access technology dual connectivity configuration, as described above.

As further shown in FIG. 10, in some aspects, process 1000 may include stopping performing the conditional handover monitoring measurements based at least in part on the multiple radio access technology dual connectivity configuration (block 1030). For example, the UE (e.g., using communication manager 140, reception component 1402, and/or transmission component 1404, depicted in FIG. 14) may stop performing the conditional handover monitoring measurements based at least in part on the multiple radio access technology dual connectivity configuration, as described above.

Process 1000 may include additional aspects, such as any single aspect or any combination of aspects described below and/or in connection with one or more other processes described elsewhere herein.

In a first aspect, process 1000 includes transmitting a reconfiguration completion message that indicates a successful application of the multiple radio access technology dual connectivity configuration, and receiving an updated conditional handover configuration. In a second aspect, alone or in combination with the first aspect, process 1000 includes performing conditional handover monitoring measurements according to the updated conditional handover configuration.

In a third aspect, alone or in combination with one or more of the first and second aspects, process 1000 includes transmitting a reconfiguration completion message that indicates a successful application of the multiple radio access technology dual connectivity configuration, and receiving a continuation message that indicates that the UE is to continue performing conditional handover monitoring measurements according to the conditional handover configuration. In a fourth aspect, alone or in combination with the third aspect, process 1000 includes resuming performing the conditional handover monitoring measurements according to the conditional handover configuration.

In a fifth aspect, alone or in combination with one or more of the first through fourth aspects, process 1000 includes performing a random access channel procedure associated with a PSCell, accessing the PSCell based at least in part on the random access channel procedure, and discarding the conditional handover configuration in response to accessing the PSCell. In a sixth aspect, alone or in combination with one or more of the first through fourth aspects, process 1000 includes performing a random access channel procedure associated with a PSCell, and resuming performing the conditional handover monitoring measurements according to the conditional handover configuration in response to a failure of the random access channel procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
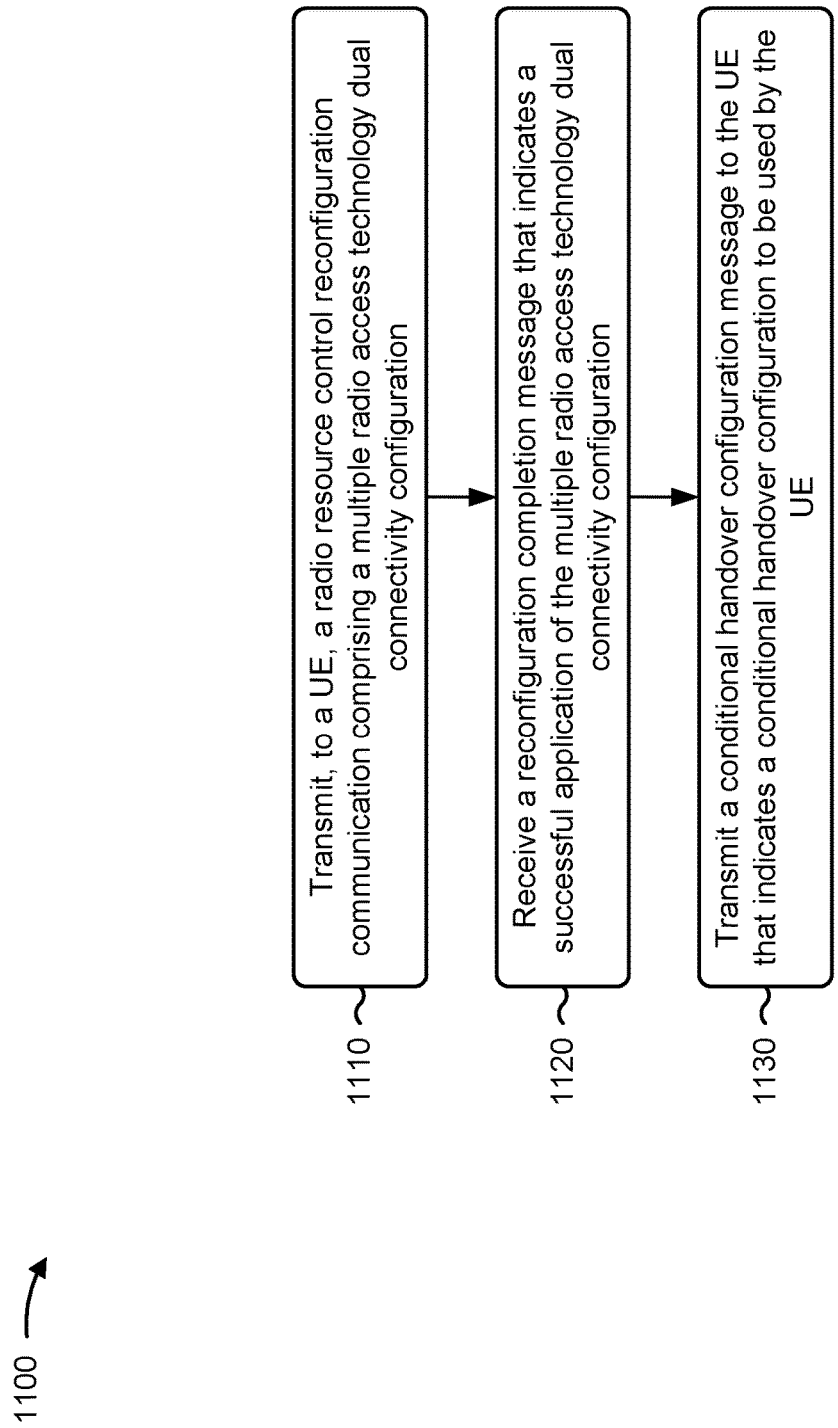

FIG. 11 is a diagram illustrating an example process 1100 performed, for example, by a network node, in accordance with the present disclosure. Example process 1100 is an example where the network node (e.g., the source master node 610 and/or the source master node 710) performs operations associated with conditional handover with multiple radio access technology dual connectivity.

As shown in FIG. 11, in some aspects, process 1100 may include transmitting, to a UE, a radio resource control reconfiguration communication comprising a multiple radio access technology dual connectivity configuration (block 1110). For example, the network node (e.g., using communication manager 150 and/or transmission component 1504, depicted in FIG. 15) may transmit, to a UE, a radio resource control reconfiguration communication comprising a multiple radio access technology dual connectivity configuration, as described above.

As further shown in FIG. 11, in some aspects, process 1100 may include receiving a reconfiguration completion message that indicates a successful application of the multiple radio access technology dual connectivity configuration (block 1120). For example, the network node (e.g., using communication manager 150 and/or reception component 1502, depicted in FIG. 15) may receive a reconfiguration completion message that indicates a successful application of the multiple radio access technology dual connectivity configuration, as described above.

As further shown in FIG. 11, in some aspects, process 1100 may include transmitting a conditional handover configuration message to the UE that indicates a conditional handover configuration to be used by the UE (block 1130). For example, the network node (e.g., using communication manager 150 and/or transmission component 1504, depicted in FIG. 15) may transmit a conditional handover configuration message to the UE that indicates a conditional handover configuration to be used by the UE, as described above.

Process 1100 may include additional aspects, such as any single aspect or any combination of aspects described below and/or in connection with one or more other processes described elsewhere herein.

In a first aspect, the conditional handover configuration message indicates that the UE is to resume using an initial conditional handover configuration. In a second aspect, alone or in combination with the first aspect, the conditional handover configuration message includes an updated conditional handover configuration to be used by the UE.

In a third aspect, alone or in combination with the second aspect, process 1100 includes performing a conditional handover configuration modification procedure associated with one or more target master nodes to obtain the updated conditional handover configuration. In a fourth aspect, alone or in combination with the third aspect, performing the conditional handover configuration modification procedure comprises performing the conditional handover configuration modification procedure based at least in part on using the multiple radio access technology dual connectivity configuration as a source configuration of the conditional handover configuration modification procedure.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
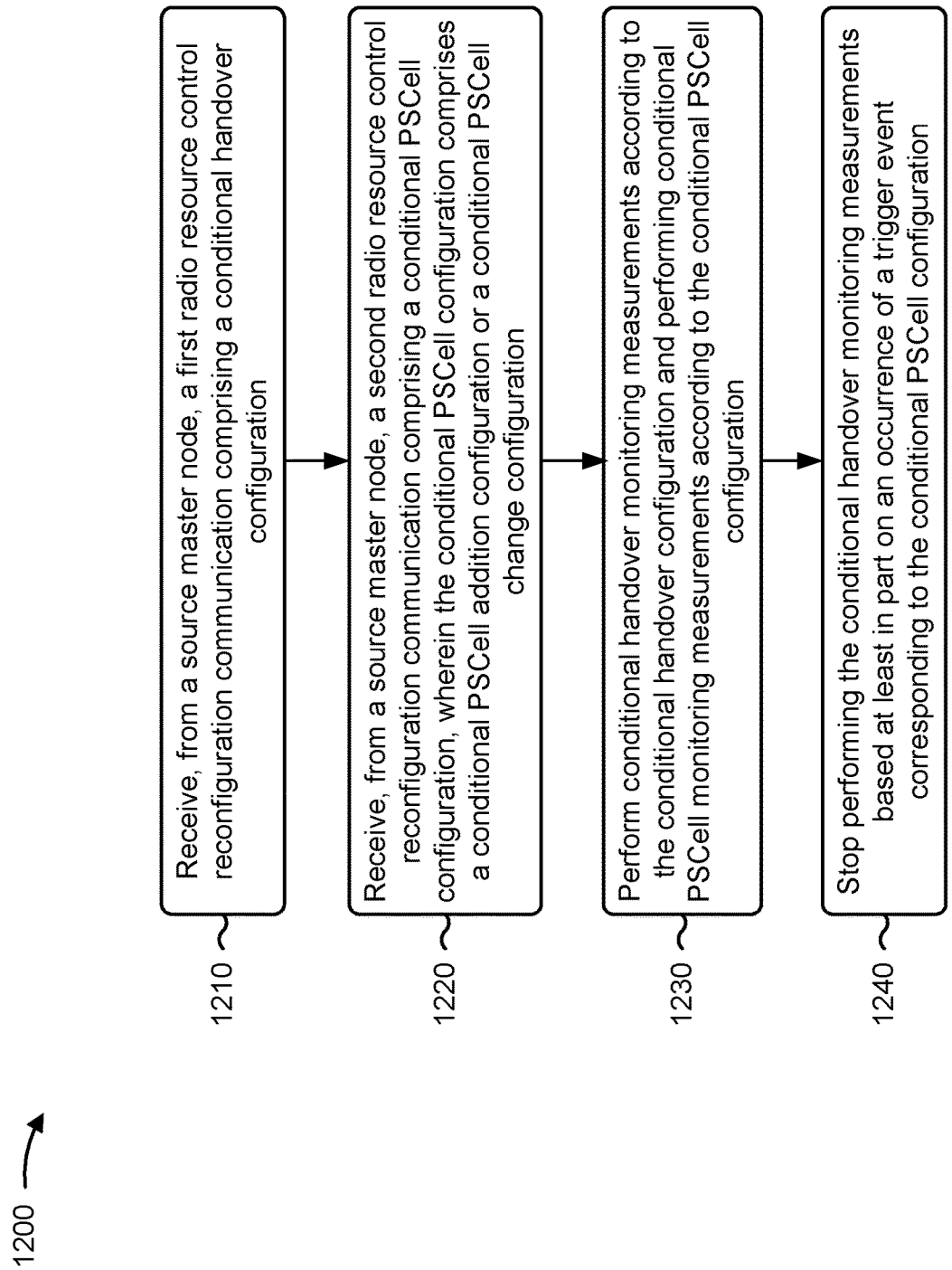

FIG. 12 is a diagram illustrating an example process 1200 performed, for example, by a UE, in accordance with the present disclosure. Example process 1200 is an example where the UE (e.g., UE 802) performs operations associated with conditional handover with multiple radio access technology dual connectivity.

As shown in FIG. 12, in some aspects, process 1200 may include receiving, from a source master node, a first radio resource control reconfiguration communication comprising a conditional handover configuration (block 1210). For example, the UE (e.g., using communication manager 140 and/or reception component 1402, depicted in FIG. 14) may receive, from a source master node, a first radio resource control reconfiguration communication comprising a conditional handover configuration, as described above.

As further shown in FIG. 12, in some aspects, process 1200 may include receiving, from a source master node, a second radio resource control reconfiguration communication comprising a conditional PSCell configuration, wherein the conditional PSCell configuration comprises a conditional PSCell addition configuration or a conditional PSCell change configuration (block 1220). For example, the UE (e.g., using communication manager 140 and/or reception component 1402, depicted in FIG. 14) may receive, from a source master node, a second radio resource control reconfiguration communication comprising a conditional PSCell configuration, wherein the conditional PSCell configuration comprises a conditional PSCell addition configuration or a conditional PSCell change configuration, as described above.

As further shown in FIG. 12, in some aspects, process 1200 may include performing conditional handover monitoring measurements according to the conditional handover configuration and performing conditional PSCell monitoring measurements according to the conditional PSCell configuration (block 1230). For example, the UE (e.g., using communication manager 140, reception component 1402, and/or transmission component 1404, depicted in FIG. 14) may perform conditional handover monitoring measurements according to the conditional handover configuration and performing conditional PSCell monitoring measurements according to the conditional PSCell configuration, as described above.

As further shown in FIG. 12, in some aspects, process 1200 may include stopping performing the conditional handover monitoring measurements based at least in part on an occurrence of a trigger event corresponding to the conditional PSCell configuration (block 1240). For example, the UE (e.g., using communication manager 140, reception component 1402, and/or transmission component 1404, depicted in FIG. 14) may stop performing the conditional handover monitoring measurements based at least in part on an occurrence of a trigger event corresponding to the conditional PSCell configuration, as described above.

Process 1200 may include additional aspects, such as any single aspect or any combination of aspects described below and/or in connection with one or more other processes described elsewhere herein.

In a first aspect, process 1200 includes performing a random access channel procedure associated with a PSCell corresponding to the occurrence of the trigger event, accessing the PSCell based at least in part on the random access channel procedure, applying a multiple radio access technology dual connectivity configuration associated with the PSCell corresponding to the occurrence of the trigger event, and discarding the conditional handover configuration in response to accessing the PSCell and applying a multiple radio access technology dual connectivity configuration.

In a second aspect, alone or in combination with the first aspect, process 1200 includes performing a random access channel procedure associated with the PSCell corresponding to the occurrence of the trigger event, and resuming performing the conditional handover monitoring measurements according to the conditional handover configuration in response to a failure of the random access channel procedure.

In a third aspect, alone or in combination with one or more of the first and second aspects, the first radio resource control communication includes one or more indications corresponding, respectively, to one or more prepared target primary cells, wherein each indication indicates whether the UE is to keep or discard a conditional handover configuration associated with a respective prepared target primary cell upon completing a PSCell addition procedure. In a fourth aspect, alone or in combination with the third aspect, an indication of the one or more indications indicates that the UE is to keep the conditional handover configuration associated with the respective prepared target primary cell based at least in part on a target primary cell configuration corresponding to the respective prepared target primary cell being a full configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
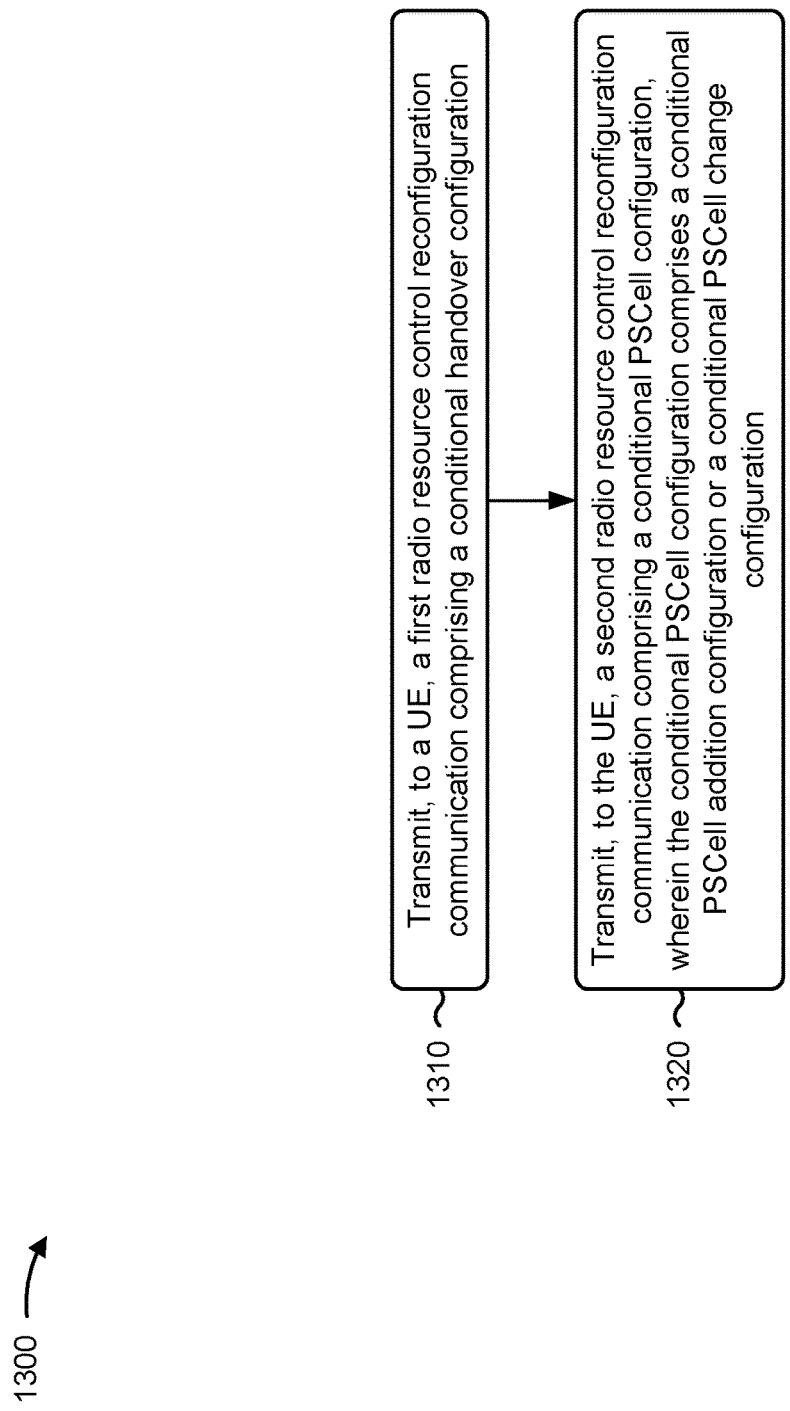

FIG. 13 is a diagram illustrating an example process 1300 performed, for example, by a network node, in accordance with the present disclosure. Example process 1300 is an example where the network node (e.g., the source master node 804) performs operations associated with conditional handover with multiple radio access technology dual connectivity.

As shown in FIG. 13, in some aspects, process 1300 may include transmitting, to a UE, a first radio resource control reconfiguration communication comprising a conditional handover configuration (block 1310). For example, the network node (e.g., using communication manager 150 and/or transmission component 1504, depicted in FIG. 15) may transmit, to a UE, a first radio resource control reconfiguration communication comprising a conditional handover configuration, as described above.

As further shown in FIG. 13, in some aspects, process 1300 may include transmitting, to the UE, a second radio resource control reconfiguration communication comprising a conditional PSCell configuration, wherein the conditional PSCell configuration comprises a conditional PSCell addition configuration or a conditional PSCell change configuration (block 1320). For example, the network node (e.g., using communication manager 150 and/or transmission component 1504, depicted in FIG. 15) may transmit, to the UE, a second radio resource control reconfiguration communication comprising a conditional PSCell configuration, wherein the conditional PSCell configuration comprises a conditional PSCell addition configuration or a conditional PSCell change configuration, as described above.

Process 1300 may include additional aspects, such as any single aspect or any combination of aspects described below and/or in connection with one or more other processes described elsewhere herein.

In a first aspect, the first radio resource control communication includes one or more indications corresponding, respectively, to one or more prepared target primary cells, wherein each indication indicates whether the UE is to keep or discard a conditional handover configuration associated with a respective prepared target primary cell upon completing a PSCell addition procedure. In a second aspect, alone or in combination with the first aspect, an indication of the one or more indications indicates that the UE is to keep the conditional handover configuration associated with the respective prepared target primary cell based at least in part on a target primary cell configuration corresponding to the respective prepared target primary cell being a full configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
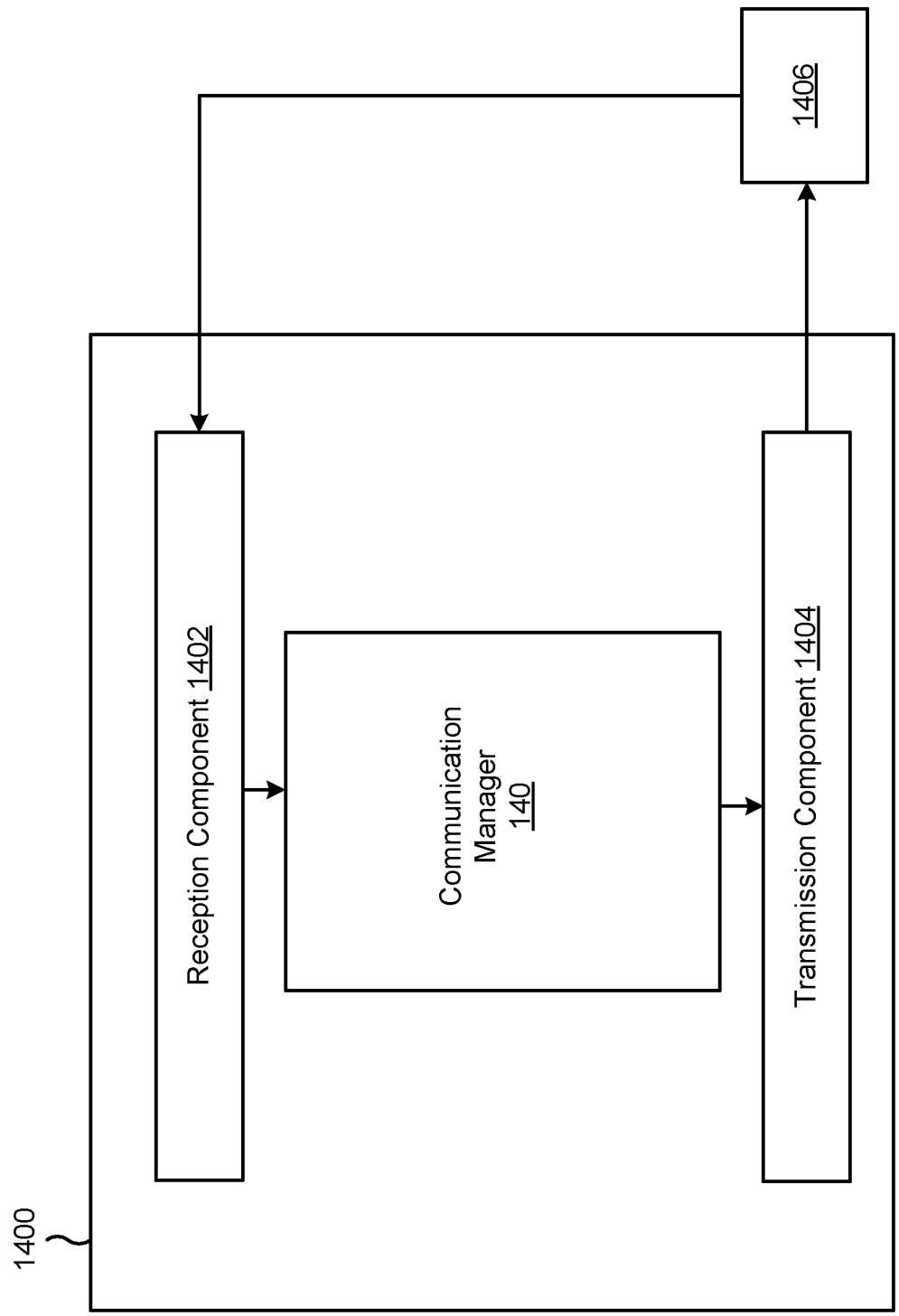
FIGS. 14 and 15 are diagrams of example apparatuses for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140.

In some aspects, the apparatus 1400 may be configured to perform one or more operations described herein in connection with FIGS. 4-8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The communication manager 140, the reception component 1402, and/or the transmission component 1404 may perform conditional handover monitoring measurements according to a conditional handover configuration. The reception component 1402 may receive, from a source master node, a radio resource control reconfiguration communication comprising a multiple radio access technology dual connectivity configuration. The communication manager 140, the reception component 1402, and/or the transmission component 1404 may stop performing the conditional handover monitoring measurements based at least in part on the multiple radio access technology dual connectivity configuration. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 1402 and/or the transmission component 1404.

The transmission component 1404 may transmit a reconfiguration completion message that indicates a successful application of the multiple radio access technology dual connectivity configuration. The reception component 1402 may receive an updated conditional handover configuration.

The communication manager 140, the reception component 1402, and/or the transmission component 1404 may perform conditional handover monitoring measurements according to the updated conditional handover configuration. The transmission component 1404 may transmit a reconfiguration completion message that indicates a successful application of the multiple radio access technology dual connectivity configuration. The reception component 1402 may receive a continuation message that indicates that the UE is to continue performing conditional handover monitoring measurements according to the conditional handover configuration. The communication manager 140, the reception component 1402, and/or the transmission component 1404 may resume performing the conditional handover monitoring measurements according to the conditional handover configuration.

The communication manager 140, the reception component 1402, and/or the transmission component 1404 may perform a random access channel procedure associated with a PSCell. The communication manager 140, the reception component 1402, and/or the transmission component 1404 may access the PSCell based at least in part on the random access channel procedure. The communication manager 140 may discard the conditional handover configuration in response to accessing the PSCell. The communication manager 140, the reception component 1402, and/or the transmission component 1404 may perform a random access channel procedure associated with a PSCell. The communication manager 140, the reception component 1402, and/or the transmission component 1404 may resume performing the conditional handover monitoring measurements according to the conditional handover configuration in response to a failure of the random access channel procedure.

The reception component 1402 may receive, from a source master node, a first radio resource control reconfiguration communication comprising a conditional handover configuration. The reception component 1402 may receive, from a source master node, a second radio resource control reconfiguration communication comprising a conditional PSCell configuration, wherein the conditional PSCell configuration comprises a conditional PSCell addition configuration or a conditional PSCell change configuration. The communication manager 140, the reception component 1402, and/or the transmission component 1404 may perform conditional handover monitoring measurements according to the conditional handover configuration and performing conditional PSCell monitoring measurements according to the conditional PSCell configuration. The communication manager 140, the reception component 1402, and/or the transmission component 1404 may stop performing the conditional handover monitoring measurements based at least in part on an occurrence of a trigger event corresponding to the conditional PSCell configuration.

The communication manager 140, the reception component 1402, and/or the transmission component 1404 may perform a random access channel procedure associated with a PSCell corresponding to the occurrence of the trigger event. The communication manager 140, the reception component 1402, and/or the transmission component 1404 may access the PSCell based at least in part on the random access channel procedure. The communication manager 140, the reception component 1402, and/or the transmission component 1404 may apply a multiple radio access technology dual connectivity configuration associated with the PSCell corresponding to the occurrence of the trigger event.

The communication manager 140 may discard the conditional handover configuration in response to accessing the PSCell and applying a multiple radio access technology dual connectivity configuration. The communication manager 140, the reception component 1402, and/or the transmission component 1404 may perform a random access channel procedure associated with the PSCell corresponding to the occurrence of the trigger event. The communication manager 140, the reception component 1402, and/or the transmission component 1404 may resume performing the conditional handover monitoring measurements according to the conditional handover configuration in response to a failure of the random access channel procedure.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
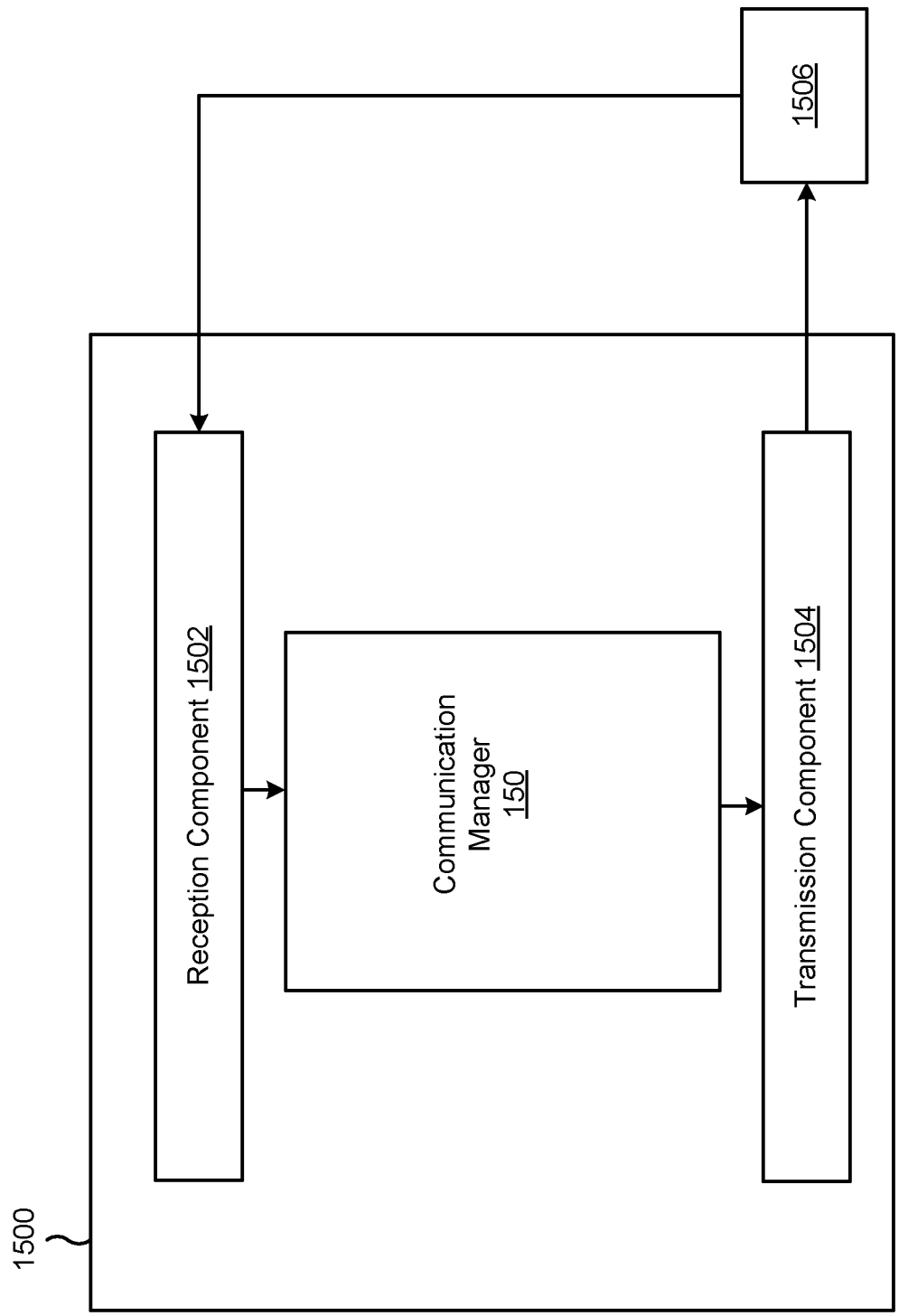

FIG. 15 is a diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150.

In some aspects, the apparatus 1500 may be configured to perform one or more operations described herein in connection with FIGS. 4-8. Additionally, or alternatively, the apparatus 1500 may be configured to perform one or more processes described herein, such as process 900 of FIG. 9, process 1100 of FIG. 11, process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The reception component 1502 may receive, from a source master node, a secondary node release request corresponding to a conditional handover operation associated with a UE operating in accordance with multiple radio access technology dual connectivity, wherein the secondary node release request indicates that the network node is to continue to be a secondary node associated with the UE or that a target secondary node is to be the secondary node associated with the UE. The communication manager 150, the reception component 1502, and/or the transmission component 1504 may perform a data transfer operation based at least in part on receiving the secondary node release request. In some aspects, the communication manager 150 may include one or more antennas, a modem, a modulator, a transmit MIMO processor, a transmit processor, a controller/processor, a memory, or a combination thereof, of the network node described in connection with FIG. 2. In some aspects, the communication manager 150 may include the reception component 1502 and/or the transmission component 1504.

The reception component 1502 may receive an indication that indicates a set of secondary-node-terminated data bearers that are not to be moved to a target master node. The communication manager 150, the reception component 1502, and/or the transmission component 1504 may use the set of secondary-node-terminated data bearers to communicate with the UE based at least in part on a successful completion of a random access channel procedure to connect to the UE. The reception component 1502 may receive an indication that indicates a set of secondary-node-terminated data bearers that are to be moved to a target master node. The communication manager 150, the reception component 1502, and/or the transmission component 1504 may stop using the set of secondary-node-terminated data bearers for data transmissions to the UE.

The transmission component 1504 may transmit, to a UE, a radio resource control reconfiguration communication comprising a multiple radio access technology dual connectivity configuration. The reception component 1502 may receive a reconfiguration completion message that indicates a successful application of the multiple radio access technology dual connectivity configuration. The transmission component 1504 may transmit a conditional handover configuration message to the UE that indicates a conditional handover configuration to be used by the UE. The communication manager 150, the reception component 1502, and/or the transmission component 1504 may perform a conditional handover configuration modification procedure associated with one or more target master nodes to obtain the updated conditional handover configuration.

The transmission component 1504 may transmit, to a UE, a first radio resource control reconfiguration communication comprising a conditional handover configuration. The transmission component 1504 may transmit, to the UE, a second radio resource control reconfiguration communication comprising a conditional PSCell configuration, wherein the conditional PSCell configuration comprises a conditional PSCell addition configuration or a conditional PSCell change configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
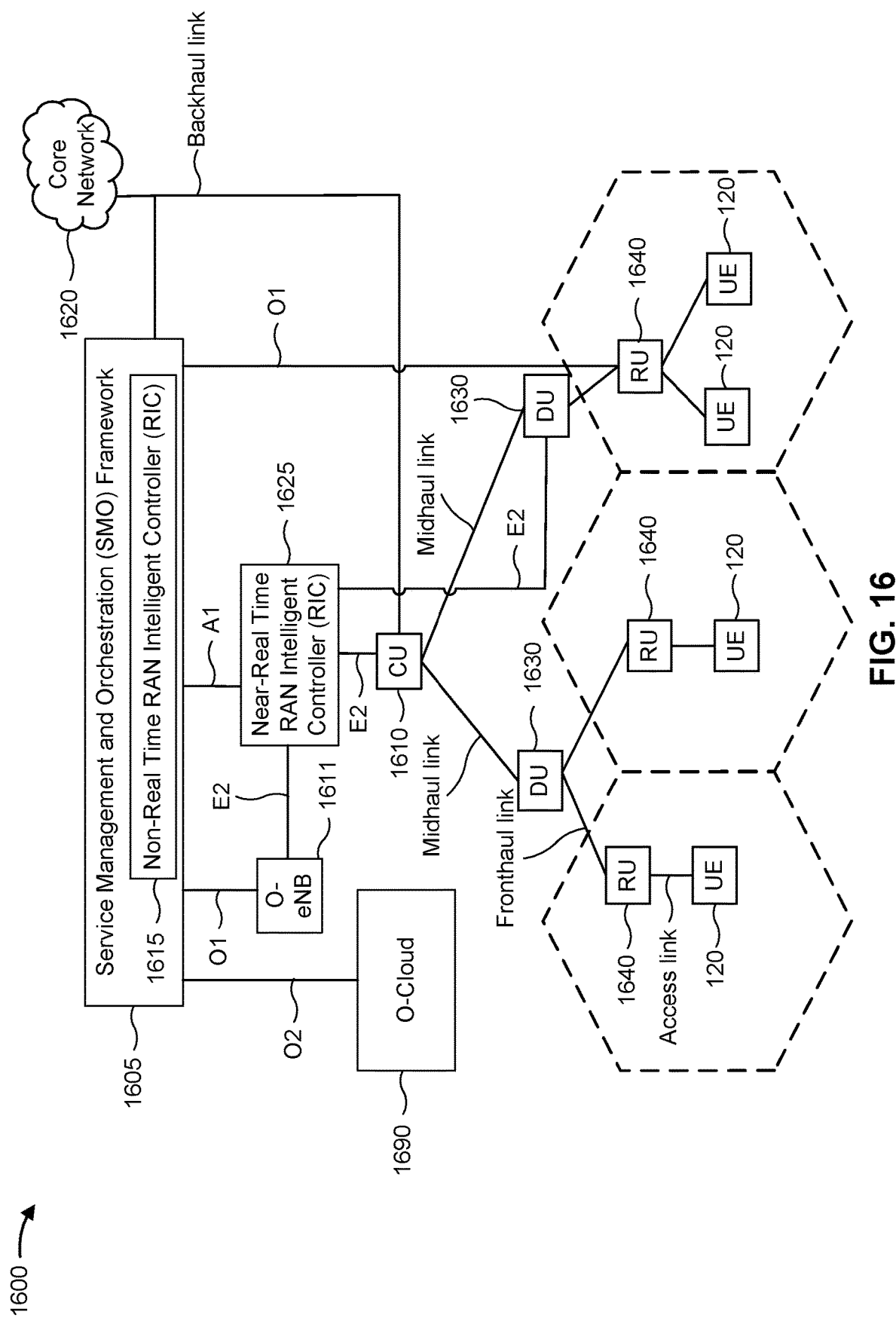
FIG. 16 is a diagram of an example disaggregated base station architecture, in accordance with the present disclosure.

FIG. 16 is a diagram illustrating an example disaggregated base station architecture 1600, in accordance with the present disclosure. The disaggregated base station architecture 1600 may include a CU 1610 that can communicate directly with a core network 1620 via a backhaul link, or indirectly with the core network 1620 through one or more disaggregated control units (such as a Near-RT RIC 1625 via an E2 link, or a Non-RT RIC 1615 associated with a Service Management and Orchestration (SMO) Framework 1605, or both). A CU 1610 may communicate with one or more DUs 1630 via respective midhaul links, such as through F1 interfaces. Each of the DUs 1630 may communicate with one or more RUs 1640 via respective fronthaul links. Each of the RUs 1640 may communicate with one or more UEs 120 via respective radio frequency (RF) access links. In some implementations, a UE 120 may be simultaneously served by multiple RUs 1640.

Each of the units, including the CUs 1610, the DUs 1630, the RUs 1640, as well as the Near-RT RICs 1625, the Non-RT RICs 1615, and the SMO Framework 1605, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1610 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 1610. The CU 1610 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1610 can be logically split into one or more CU-UP units and one or more CU-CP units. A CU-UP unit can communicate bidirectionally with a CU-CP unit via an interface, such as the E1 interface when implemented in an O-RAN configuration. The CU 1610 can be implemented to communicate with a DU 1630, as necessary, for network control and signaling.

Each DU 1630 may correspond to a logical unit that includes one or more base station functions to control the operation of one or more RUs 1640. In some aspects, the DU 1630 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1630 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1630, or with the control functions hosted by the CU 1610.

Each RU 1640 may implement lower-layer functionality. In some deployments, an RU 1640, controlled by a DU 1630, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1640 can be operated to handle over the air (OTA) communication with one or more UEs 120. In some implementations, real-time and non-real-time aspects of control and user plane communication with the RU(s) 1640 can be controlled by the corresponding DU 1630. In some scenarios, this configuration can enable each DU 1630 and the CU 1610 to be implemented in a cloud-based RAN architecture, such as a vRAN architecture.

The SMO Framework 1605 may be configured to support RAN deployment and provisioning of non-virtualized and virtualized network elements. For non-virtualized network elements, the SMO Framework 1605 may be configured to support the deployment of dedicated physical resources for RAN coverage requirements, which may be managed via an operations and maintenance interface (such as an O1 interface). For virtualized network elements, the SMO Framework 1605 may be configured to interact with a cloud computing platform (such as an open cloud (O-Cloud) platform 1690) to perform network element life cycle management (such as to instantiate virtualized network elements) via a cloud computing platform interface (such as an O2 interface). Such virtualized network elements can include, but are not limited to, CUs 1610, DUs 1630, RUs 1640, non-RT RICs 1615, and Near-RT RICs 1625. In some implementations, the SMO Framework 1605 can communicate with a hardware aspect of a 4G RAN, such as an open eNB (O-eNB) 1611, via an O1 interface. Additionally, in some implementations, the SMO Framework 1605 can communicate directly with each of one or more RUs 1640 via a respective O1 interface. The SMO Framework 1605 also may include a Non-RT RIC 1615 configured to support functionality of the SMO Framework 1605.

The Non-RT RIC 1615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1625. The Non-RT RIC 1615 may be coupled to or communicate with (such as via an A1 interface) the Near-RT RIC 1625. The Near-RT RIC 1625 may be configured to include a logical function that enables near-real-time control and optimization of RAN elements and resources via data collection and actions over an interface (such as via an E2 interface) connecting one or more CUs 1610, one or more DUs 1630, or both, as well as an O-eNB, with the Near-RT RIC 1625.

In some implementations, to generate AI/ML models to be deployed in the Near-RT RIC 1625, the Non-RT RIC 1615 may receive parameters or external enrichment information from external servers. Such information may be utilized by the Near-RT RIC 1625 and may be received at the SMO Framework 1605 or the Non-RT RIC 1615 from non-network data sources or from network functions. In some examples, the Non-RT RIC 1615 or the Near-RT RIC 1625 may be configured to tune RAN behavior or performance. For example, the Non-RT RIC 1615 may monitor long-term trends and patterns for performance and employ AI/ML models to perform corrective actions through the SMO Framework 1605 (such as reconfiguration via an O1 interface) or via creation of RAN management policies (such as A1 interface policies).

As indicated above, FIG. 16 is provided as an example. Other examples may differ from what is described with regard to FIG. 16.

The following provides an overview of some Aspects of the present disclosure:

Aspect 1: A method of wireless communication performed by a network node, comprising: receiving, from a source master node, a secondary node release request corresponding to a conditional handover operation associated with a user equipment (UE) operating in accordance with multiple radio access technology dual connectivity, wherein the secondary node release request indicates that the network node is to continue to be a secondary node associated with the UE or that a target secondary node is to be the secondary node associated with the UE; and performing a data transfer operation based at least in part on receiving the secondary node release request.

Aspect 2: The method of Aspect 1, wherein the secondary node release request includes an indication that indicates that a UE context is to be maintained after the conditional handover operation.

Aspect 3: The method of either of Aspects 1 or 2, wherein performing the data transfer operation comprises stopping an early data forwarding process.

Aspect 4: The method of any of Aspects 1-3, wherein performing the data transfer operation comprises initiating a late data forwarding process.

Aspect 5: The method of any of Aspects 1-4, further comprising: receiving an indication that indicates a set of secondary-node-terminated data bearers that are not to be moved to a target master node, wherein performing the data transfer operation comprises using the set of secondary-node-terminated data bearers to communicate with the UE based at least in part on a successful completion of a random access channel procedure to connect to the UE.

Aspect 6: The method of any of Aspects 1-5, further comprising: receiving an indication that indicates a set of secondary-node-terminated data bearers that are to be moved to a target master node, wherein performing the data transfer operation comprises stopping using the set of secondary-node-terminated data bearers for data transmissions to the UE.

Aspect 7: A method of wireless communication performed by a user equipment (UE), comprising: performing conditional handover monitoring measurements according to a conditional handover configuration; receiving, from a source master node, a radio resource control reconfiguration communication comprising a multiple radio access technology dual connectivity configuration; and stopping performing the conditional handover monitoring measurements based at least in part on the multiple radio access technology dual connectivity configuration.

Aspect 8: The method of Aspect 7, further comprising: transmitting a reconfiguration completion message that indicates a successful application of the multiple radio access technology dual connectivity configuration; and receiving an updated conditional handover configuration.

Aspect 9: The method of Aspect 8, further comprising performing conditional handover monitoring measurements according to the updated conditional handover configuration.

Aspect 10: The method of any of Aspects 7-9, further comprising: transmitting a reconfiguration completion message that indicates a successful application of the multiple radio access technology dual connectivity configuration; and receiving a continuation message that indicates that the UE is to continue performing conditional handover monitoring measurements according to the conditional handover configuration.

Aspect 11: The method of Aspect 10, further comprising resuming performing the conditional handover monitoring measurements according to the conditional handover configuration.

Aspect 12: The method of any of Aspects 7-11, further comprising: performing a random access channel procedure associated with a primary secondary cell group cell (PSCell); accessing the PSCell based at least in part on the random access channel procedure; and discarding the conditional handover configuration in response to accessing the PSCell.

Aspect 13: The method of any of Aspects 7-11, further comprising: performing a random access channel procedure associated with a primary secondary cell group cell (PSCell); and resuming performing the conditional handover monitoring measurements according to the conditional handover configuration in response to a failure of the random access channel procedure.

Aspect 14: A method of wireless communication performed by a network node, comprising: transmitting, to a user equipment (UE), a radio resource control reconfiguration communication comprising a multiple radio access technology dual connectivity configuration; receiving a reconfiguration completion message that indicates a successful application of the multiple radio access technology dual connectivity configuration; and transmitting a conditional handover configuration message to the UE that indicates a conditional handover configuration to be used by the UE.

Aspect 15: The method of Aspect 14, wherein the conditional handover configuration message indicates that the UE is to resume using an initial conditional handover configuration.

Aspect 16: The method of either of Aspects 14 or 15, wherein the conditional handover configuration message includes an updated conditional handover configuration to be used by the UE.

Aspect 17: The method of Aspect 16, further comprising performing a conditional handover configuration modification procedure associated with one or more target master nodes to obtain the updated conditional handover configuration.

Aspect 18: The method of Aspect 17, wherein performing the conditional handover configuration modification procedure comprises performing the conditional handover configuration modification procedure based at least in part on using the multiple radio access technology dual connectivity configuration as a source configuration of the conditional handover configuration modification procedure.

Aspect 19: A method of wireless communication performed by a user equipment (UE), comprising: receiving, from a source master node, a first radio resource control reconfiguration communication comprising a conditional handover configuration; receiving, from a source master node, a second radio resource control reconfiguration communication comprising a conditional primary secondary cell group cell (PSCell) configuration, wherein the conditional PSCell configuration comprises a conditional PSCell addition configuration or a conditional PSCell change configuration; performing conditional handover monitoring measurements according to the conditional handover configuration and performing conditional PSCell monitoring measurements according to the conditional PSCell configuration; and stopping performing the conditional handover monitoring measurements based at least in part on an occurrence of a trigger event corresponding to the conditional PSCell configuration.

Aspect 20: The method of Aspect 19, further comprising: performing a random access channel procedure associated with a PSCell corresponding to the occurrence of the trigger event; accessing the PSCell based at least in part on the random access channel procedure; applying a multiple radio access technology dual connectivity configuration associated with the PSCell corresponding to the occurrence of the trigger event; and discarding the conditional handover configuration in response to accessing the PSCell and applying a multiple radio access technology dual connectivity configuration.

Aspect 21: The method of Aspect 20, further comprising: performing a random access channel procedure associated with the PSCell corresponding to the occurrence of the trigger event; and resuming performing the conditional handover monitoring measurements according to the conditional handover configuration in response to a failure of the random access channel procedure.

Aspect 22: The method of any of Aspects 19-21, wherein the first radio resource control communication includes one or more indications corresponding, respectively, to one or more prepared target primary cells, wherein each indication indicates whether the UE is to keep or discard a conditional handover configuration associated with a respective prepared target primary cell upon completing a PSCell addition procedure.

Aspect 23: The method of Aspect 22, wherein an indication of the one or more indications indicates that the UE is to keep the conditional handover configuration associated with the respective prepared target primary cell based at least in part on a target primary cell configuration corresponding to the respective prepared target primary cell being a full configuration.

Aspect 24: A method of wireless communication performed by a network node, comprising: transmitting, to a user equipment (UE), a first radio resource control reconfiguration communication comprising a conditional handover configuration; and transmitting, to the UE, a second radio resource control reconfiguration communication comprising a conditional primary secondary cell group cell (PSCell) configuration, wherein the conditional PSCell configuration comprises a conditional PSCell addition configuration or a conditional PSCell change configuration.

Aspect 25: The method of Aspect 24, wherein the first radio resource control communication includes one or more indications corresponding, respectively, to one or more prepared target primary cells, wherein each indication indicates whether the UE is to keep or discard a conditional handover configuration associated with a respective prepared target primary cell upon completing a PSCell addition procedure.

Aspect 26: The method of Aspect 25, wherein an indication of the one or more indications indicates that the UE is to keep the conditional handover configuration associated with the respective prepared target primary cell based at least in part on a target primary cell configuration corresponding to the respective prepared target primary cell being a full configuration.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
    a memory; and
    one or more processors, coupled to the memory, configured to:
        transmit, to a user equipment (UE), a radio resource control communication that includes one or more indications corresponding, respectively, to one or more target primary cells, each indication indicating whether the UE is to keep or discard a conditional handover configuration associated with a respective target primary cell upon completing a primary cell addition procedure;
        receive, from a source master node, a secondary node release request corresponding to a conditional handover operation associated with the UE operating in accordance with multiple radio access technology dual connectivity, wherein the secondary node release request indicates that the network node is to continue to be a secondary node associated with the UE or that a target secondary node is to be the secondary node associated with the UE; and
        perform a data transfer operation based at least in part on receiving the secondary node release request.

2. The network node of claim 1, wherein the secondary node release request includes an indication that indicates that a UE context is to be maintained after the conditional handover operation.

3. The network node of claim 1, wherein the one or more processors, to perform the data transfer operation, are configured to stop an early data forwarding process.

4. The network node of claim 1, wherein the one or more processors, to perform the data transfer operation, are configured to initiate a late data forwarding process.

5. The network node of claim 1, wherein the one or more processors are further configured to receive an indication that indicates a set of secondary-node-terminated data bearers that are not to be moved to a target master node, and wherein the one or more processors, to perform the data transfer operation, are configured to use the set of secondary-node-terminated data bearers to communicate with the UE based at least in part on a successful completion of a random access channel procedure to connect to the UE.

6. The network node of claim 1, wherein the one or more processors are further configured to receive an indication that indicates a set of secondary-node-terminated data bearers that are to be moved to a target master node, and wherein the one or more processors, to perform the data transfer operation, are configured to stop using the set of secondary-node-terminated data bearers for data transmissions to the UE.

7. The network node of claim 1, wherein at least one of the one or more target primary cells is a primary secondary cell group cell (PSCell).

8. A user equipment (UE) for wireless communication, comprising:
 a memory; and
 one or more processors, coupled to the memory, configured to:
  perform conditional handover monitoring measurements according to a conditional handover configuration;
  receive a radio resource control communication that includes one or more indications corresponding, respectively, to one or more target primary cells, each indication indicating whether the UE is to keep or discard the conditional handover configuration associated with a respective target primary cell upon completing a primary cell addition procedure;
  receive, from a source master node, a radio resource control reconfiguration communication comprising a multiple radio access technology dual connectivity configuration; and
  stop performing the conditional handover monitoring measurements based at least in part on the multiple radio access technology dual connectivity configuration.

9. The UE of claim 8, wherein the one or more processors are further configured to:
 transmit a reconfiguration completion message that indicates a successful application of the multiple radio access technology dual connectivity configuration; and
 receive an updated conditional handover configuration.

10. The UE of claim 9, wherein the one or more processors are further configured to perform conditional handover monitoring measurements according to the updated conditional handover configuration.

11. The UE of claim 8, wherein the one or more processors are further configured to:
 transmit a reconfiguration completion message that indicates a successful application of the multiple radio access technology dual connectivity configuration; and
 receive a continuation message that indicates that the UE is to continue performing conditional handover monitoring measurements according to the conditional handover configuration.

12. The UE of claim 11, wherein the one or more processors are further configured to resume performing the conditional handover monitoring measurements according to the conditional handover configuration.

13. The UE of claim 8, wherein the one or more processors are further configured to:
 perform a random access channel procedure associated with a primary secondary cell group cell (PSCell);
 access the PSCell based at least in part on the random access channel procedure; and
 discard the conditional handover configuration in response to accessing the PSCell.

14. The UE of claim 8, wherein the one or more processors are further configured to:
 perform a random access channel procedure associated with a primary secondary cell group cell (PSCell); and
 resume performing the conditional handover monitoring measurements according to the conditional handover configuration in response to a failure of the random access channel procedure.

15. A network node for wireless communication, comprising:
 a memory; and
 one or more processors, coupled to the memory, configured to:
  transmit, to a user equipment (UE), a radio resource control reconfiguration communication comprising a multiple radio access technology dual connectivity configuration;
  receive a reconfiguration completion message that indicates a successful application of the multiple radio access technology dual connectivity configuration; and
  transmit a conditional handover configuration message to the UE that indicates a conditional handover configuration to be used by the UE, the conditional handover configuration including one or more indications corresponding, respectively, to one or more target primary cells, wherein each indication indicates whether the UE is to keep or discard a conditional handover configuration associated with a respective target primary cell upon completing a conditional primary secondary cell group cell (PSCell) addition procedure.

16. The network node of claim 15, wherein the conditional handover configuration message indicates that the UE is to resume using an initial conditional handover configuration.

17. The network node of claim 15, wherein the conditional handover configuration message includes an updated conditional handover configuration to be used by the UE.

18. The network node of claim 17, wherein the one or more processors are further configured to perform a conditional handover configuration modification procedure associated with one or more target master nodes to obtain the updated conditional handover configuration.

19. The network node of claim 18, wherein the one or more processors, to perform the conditional handover configuration modification procedure, are configured to perform the conditional handover configuration modification procedure based at least in part on using the multiple radio access technology dual connectivity configuration as a source configuration of the conditional handover configuration modification procedure.

20. A user equipment (UE) for wireless communication, comprising:
 a memory; and
 one or more processors, coupled to the memory, configured to:
  receive, from a source master node, a first radio resource control reconfiguration communication comprising a conditional handover configuration, the conditional handover configuration including one or more indications corresponding, respectively, to one or more target primary cells, wherein each indication indicates whether the UE is to keep or discard a conditional handover configuration associated with a respective target primary cell upon completing a conditional primary secondary cell group cell (PS-Cell) addition procedure;

receive, from a source master node, a second radio resource control reconfiguration communication comprising a conditional PSCell configuration, wherein the conditional PSCell configuration comprises a conditional PSCell addition configuration or a conditional PSCell change configuration;

perform conditional handover monitoring measurements according to the conditional handover configuration and performing conditional PSCell monitoring measurements according to the conditional PSCell configuration; and stop performing the conditional handover monitoring measurements based at least in part on an occurrence of a trigger event corresponding to the conditional PSCell configuration.

21. The UE of claim 20, wherein the one or more processors are further configured to:

perform a random access channel procedure associated with a PSCell corresponding to the occurrence of the trigger event;

access the PSCell based at least in part on the random access channel procedure;

apply a multiple radio access technology dual connectivity configuration associated with the PSCell corresponding to the occurrence of the trigger event; and discard the conditional handover configuration in response to accessing the PSCell and applying a multiple radio access technology dual connectivity configuration.

22. The UE of claim 21, wherein the one or more processors are further configured to:

perform a random access channel procedure associated with the PSCell corresponding to the occurrence of the trigger event; and resume performing the conditional handover monitoring measurements according to the conditional handover configuration in response to a failure of the random access channel procedure.

23. The UE of claim 20, wherein an indication of the one or more indications indicates that the UE is to keep the conditional handover configuration associated with a respective prepared target primary cell based at least in part on a target primary cell configuration corresponding to the respective prepared target primary cell being a full configuration.

* * * * *